United States Patent
Lahav et al.

(10) Patent No.: US 9,210,345 B2
(45) Date of Patent: Dec. 8, 2015

(54) SHARED READOUT LOW NOISE GLOBAL SHUTTER IMAGE SENSOR METHOD

(71) Applicant: Tower Semiconductor Ltd., Migdal Haemek (IL)

(72) Inventors: Assaf Lahav, Binyamina (IL); Amos Fenigstein, Haifa (IL)

(73) Assignee: Tower Semiconductor Ltd., Migdal Haemek, IL (US)

( * ) Notice: Subject to any disclaimer, the term of this patent is extended or adjusted under 35 U.S.C. 154(b) by 312 days.

(21) Appl. No.: 13/764,776

(22) Filed: Feb. 11, 2013

(65) Prior Publication Data

US 2014/0226047 A1    Aug. 14, 2014

(51) Int. Cl.
*H04N 5/357*    (2011.01)
*H04N 5/3745*   (2011.01)
*H04N 5/353*    (2011.01)

(52) U.S. Cl.
CPC ......... *H04N 5/3575* (2013.01); *H04N 5/37452* (2013.01); *H04N 5/37457* (2013.01); *H04N 5/3532* (2013.01)

(58) Field of Classification Search
CPC .................................................... H04N 5/3575
See application file for complete search history.

(56) References Cited

U.S. PATENT DOCUMENTS

| | | | | |
|---|---|---|---|---|
| 5,517,243 | A * | 5/1996 | Kudo et al. | 348/296 |
| 5,543,838 | A | 8/1996 | Hosier et al. | |
| 6,160,281 | A | 12/2000 | Guidash | |
| 6,259,478 | B1 * | 7/2001 | Hori | 348/296 |
| 7,538,307 | B1 * | 5/2009 | Lauxtermann | 250/207 |
| 7,714,917 | B2 | 5/2010 | McKee | |
| 8,089,036 | B2 | 1/2012 | Manabe | |
| 2004/0081446 | A1 * | 4/2004 | Compton | 396/362 |
| 2008/0231736 | A1 * | 9/2008 | Solhusvik | 348/294 |
| 2009/0108176 | A1 * | 4/2009 | Blanquart | 250/208.1 |
| 2010/0013972 | A1 * | 1/2010 | Adkisson et al. | 348/308 |
| 2012/0229669 | A1 * | 9/2012 | Okada et al. | 348/222.1 |
| 2013/0027596 | A1 * | 1/2013 | Wan | 348/302 |
| 2013/0044247 | A1 * | 2/2013 | Kawahito et al. | 348/296 |
| 2014/0226046 | A1 | 8/2014 | Lahav et al. | |

OTHER PUBLICATIONS

Lahav, Assaf, et al. "Design of photo-electron barrier for the Memory Node of a Global Shutter pixel based on a Pinned Photodiode", International Image Sensor Workshop (IISW), Bergen, Norway, Jun. 22-28, 2009, 3 pages.

Lauxtermann, Stefan, et al. "Comparison of Global Shutter Pixels for CMOS Image Sensors", International Image Sensor Workshop (IISW), Ogunquit, Maine, USA, Jun. 7-10, 2007, pp. 82-85.

Mori, Mitsuyoshi, et al. "1/4-Inch 2-Mpixel MOS Image Sensor With 1.75 Transistors/Pixel", IEEE Journal of Solid-State Circuits, vol. 39, No. 12, Dec. 2004, pp. 2426-2430.

* cited by examiner

*Primary Examiner* — Twyler Haskins
*Assistant Examiner* — Akshay Trehan
(74) *Attorney, Agent, or Firm* — Bever, Hoffman & Harms, LLP

(57) ABSTRACT

A method for operating a global shutter image sensor includes performing both a global shutter (image capture) operation and a rolling shutter (readout) operation. During the global shutter operation, image information (charges) are captured by photodiodes in every pixel, and then simultaneously transferred to charge coupled gate (CCG) devices provided in each pixel. The rolling shutter operation includes performing multiple correlated double sampling (CDS) readout phases utilizing readout circuits that are shared by groups of pixels (e.g., four pixels share each readout circuit) having CCG devices connected in a chain. After resetting a floating diffusion in the readout circuit, a first captured charge is transferred to floating diffusion for readout, and the remaining charges are shifted along the CCG chain. The remaining CCG devices are then sequentially read out by repeating the read-and-shift operation. The readout operation is then repeated for each row of pixel groups.

17 Claims, 16 Drawing Sheets

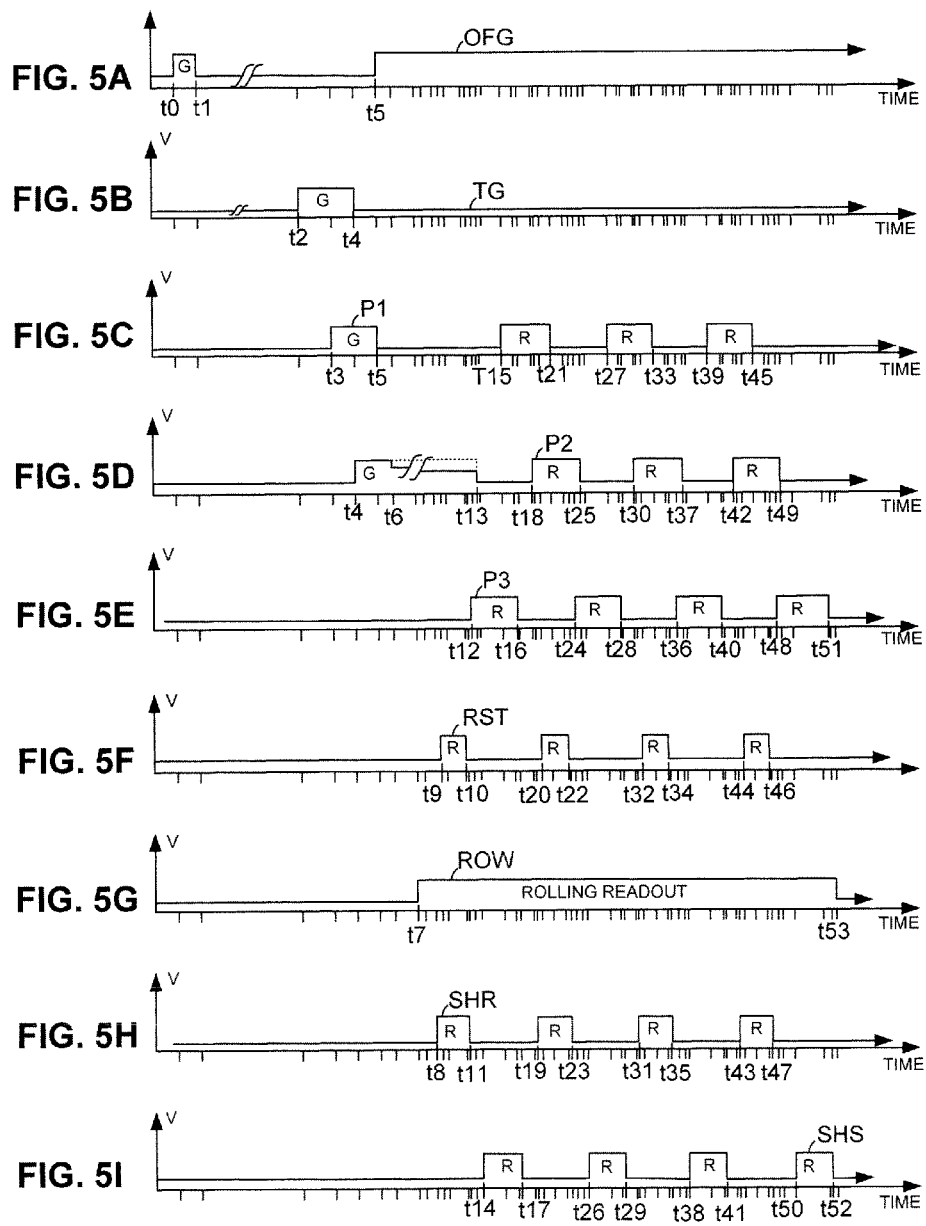

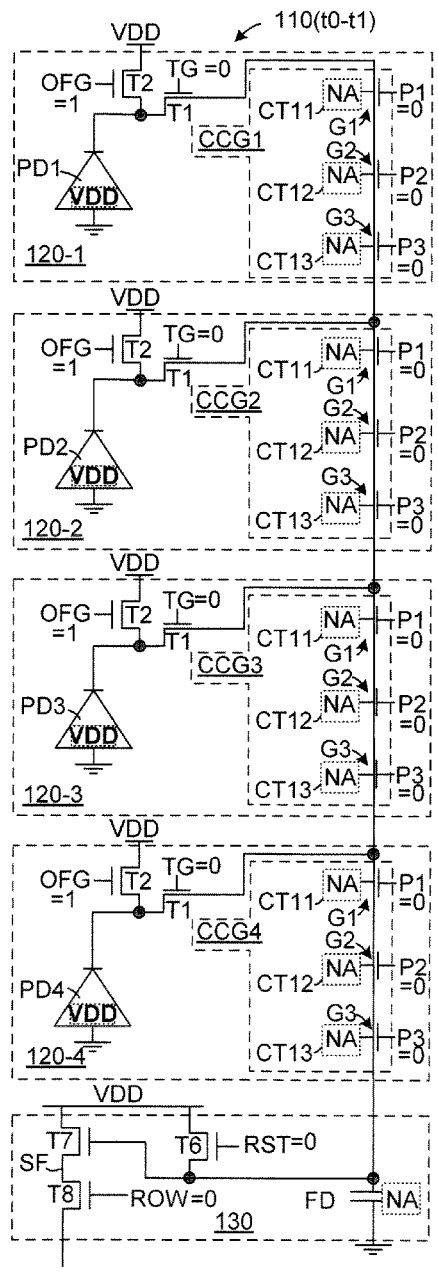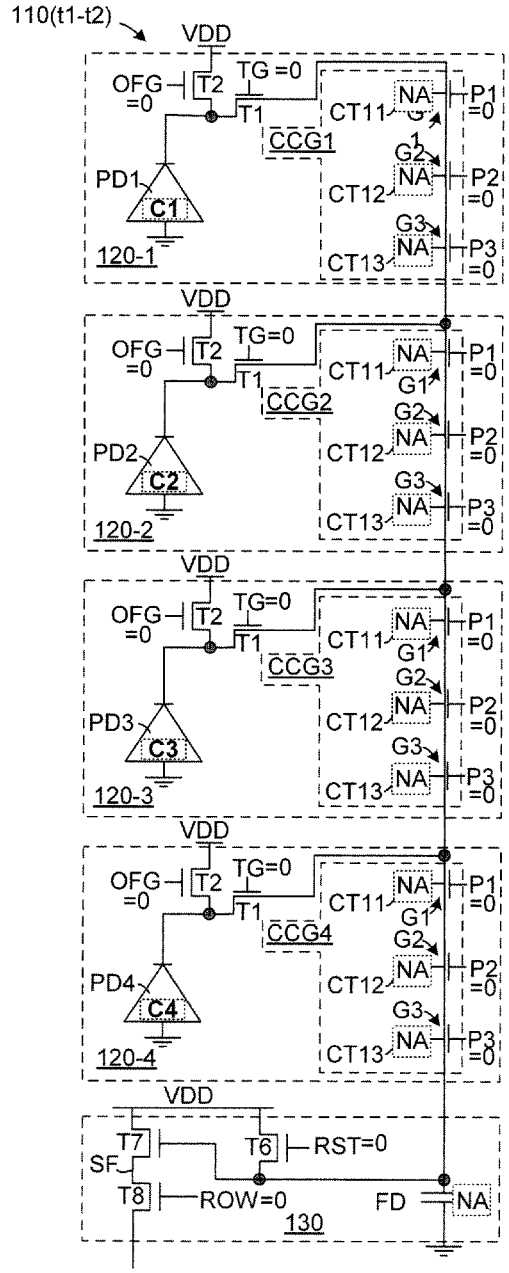
FIG. 6A  FIG. 6B

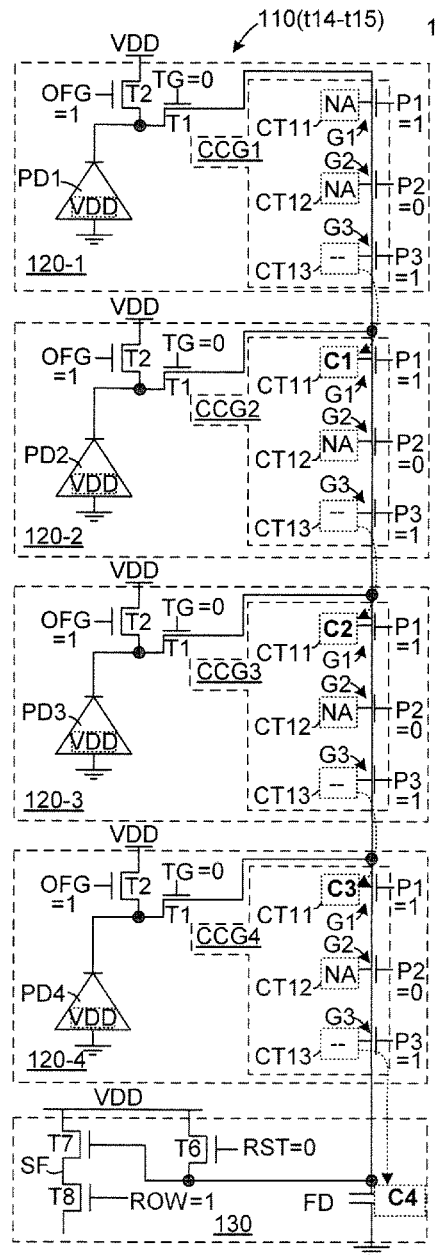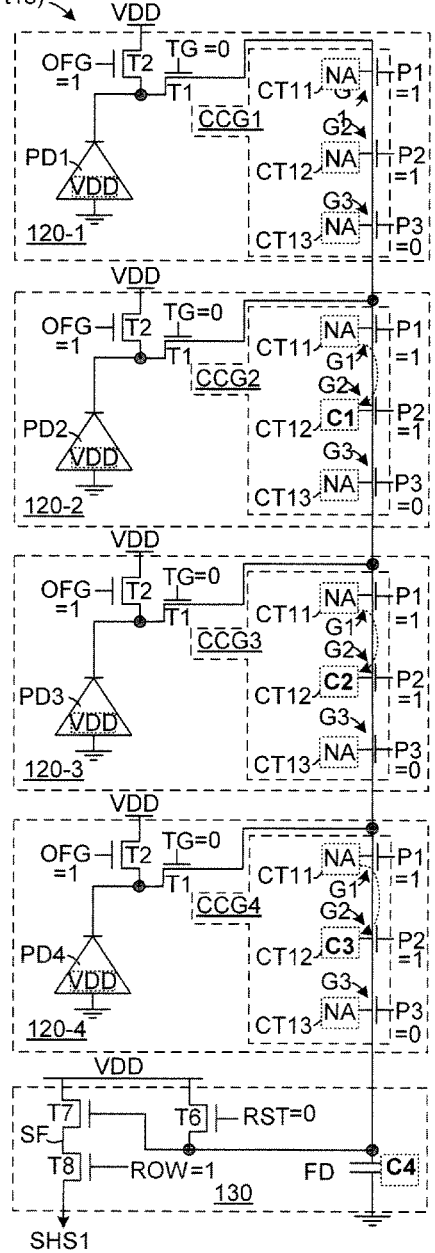
FIG. 8C  FIG. 8D

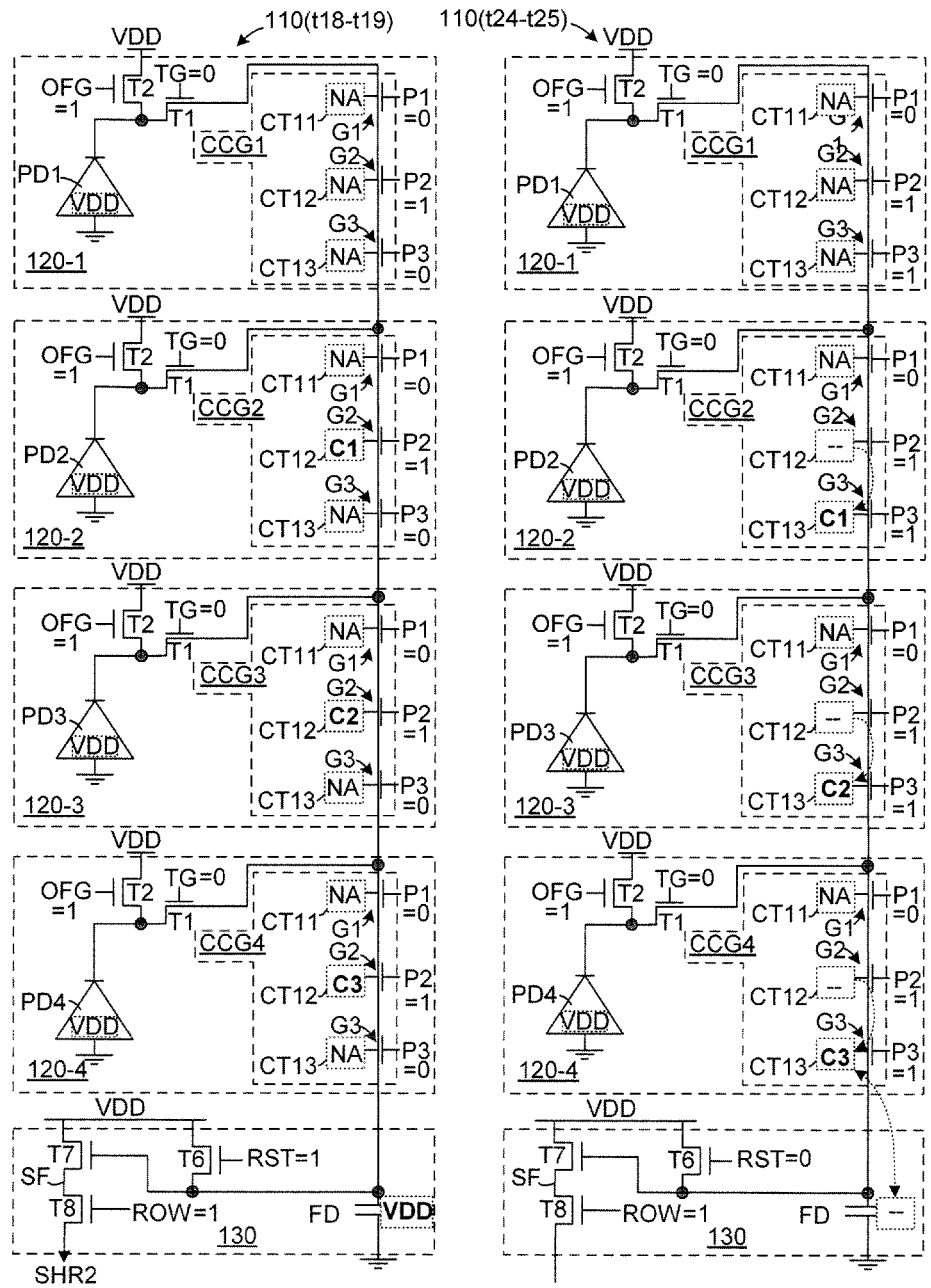
FIG. 9A  FIG. 9B

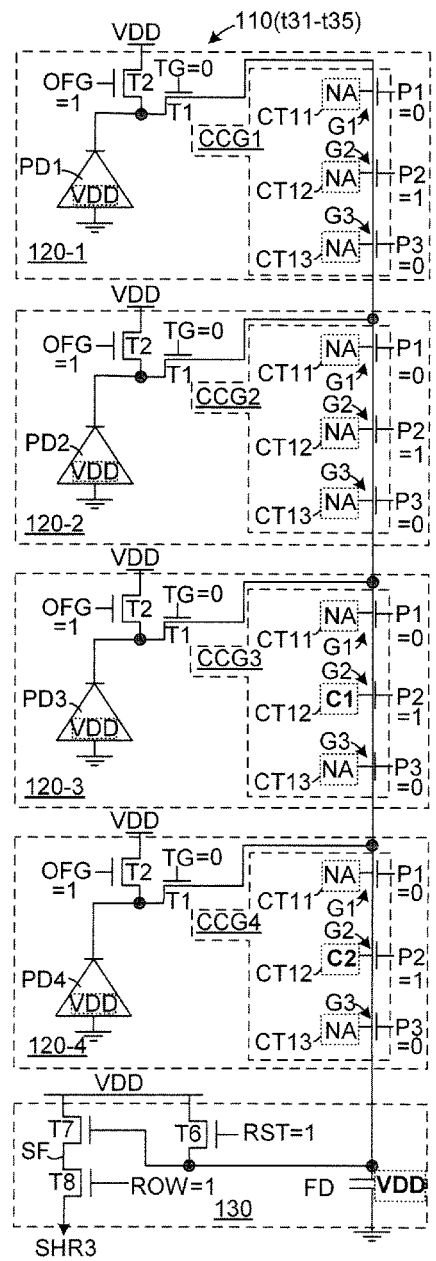
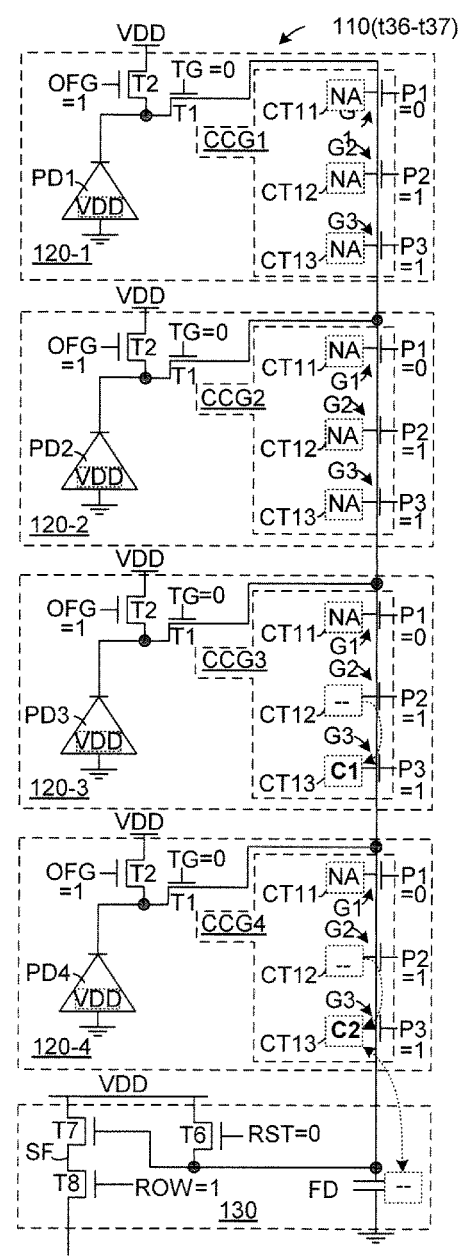
FIG. 10A          FIG. 10B

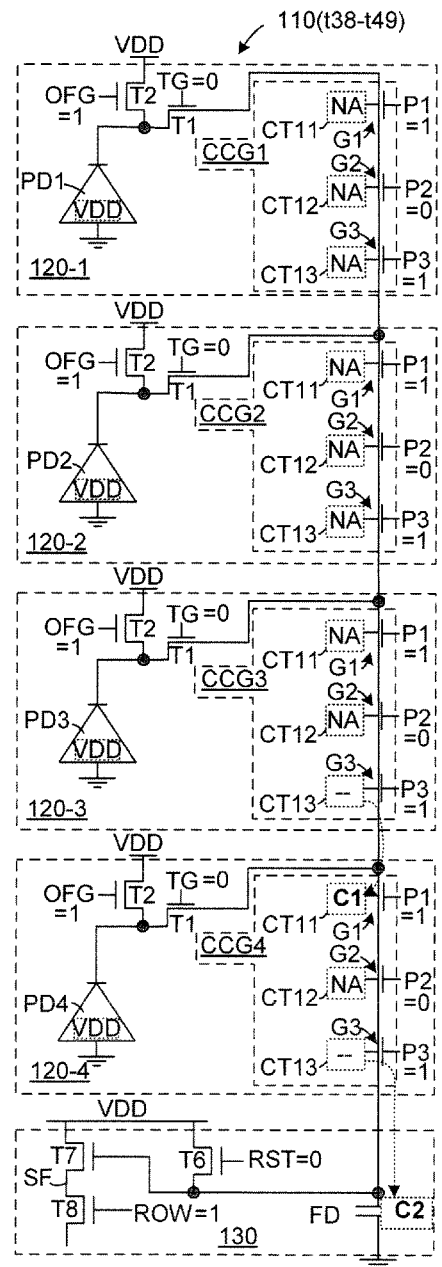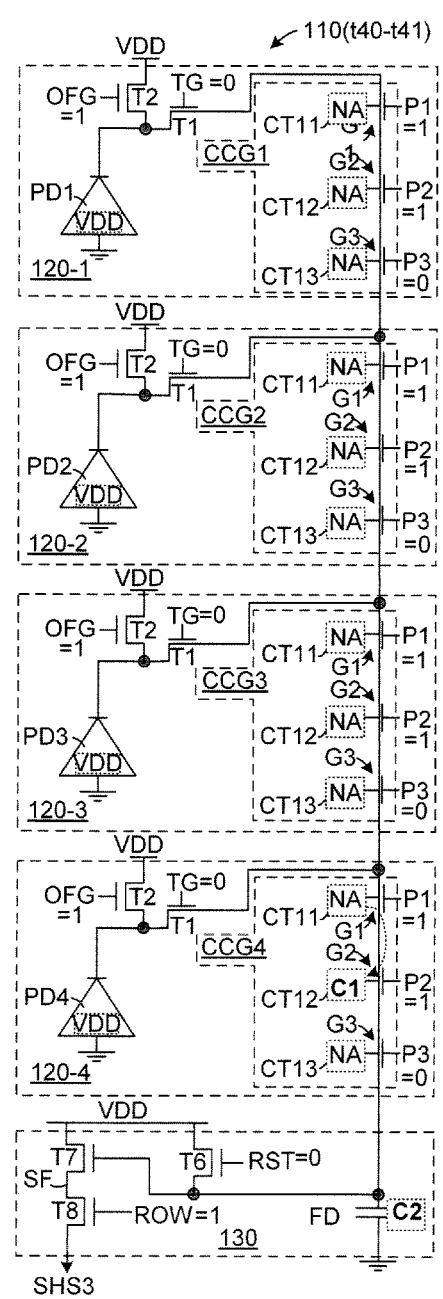
FIG. 10C  FIG. 10D

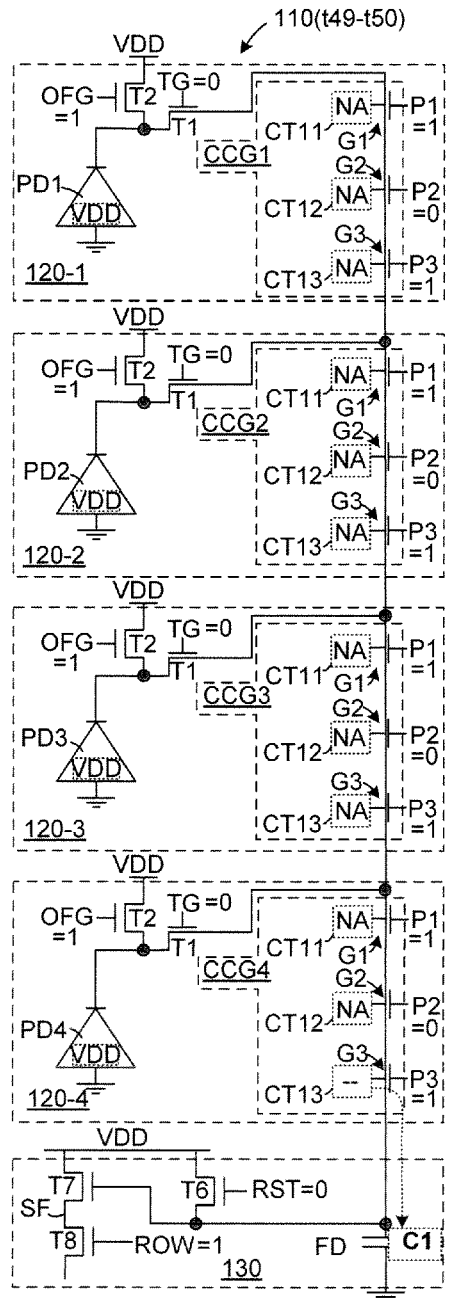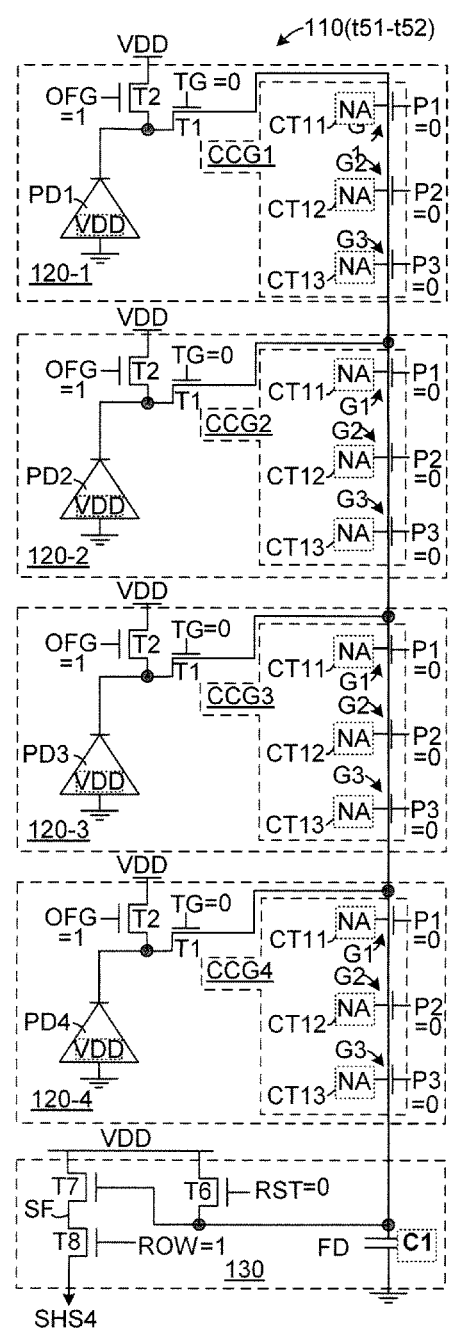
FIG. 11C  FIG. 11D

SHARED READOUT LOW NOISE GLOBAL SHUTTER IMAGE SENSOR METHOD

FIELD OF THE INVENTION

This invention relates to solid state image sensors, and more specifically to solid state image sensors having an electronic Global Shutter (GS).

BACKGROUND OF THE INVENTION

Solid-state image sensors are used in, for example, video cameras, and are presently realized in a number of forms including charge coupled devices (CCDs) and CMOS image sensors. These image sensors are based on a two dimensional array of pixels. Each pixel includes a sensing element that is capable of converting a portion of an optical image into an electronic signal. These electronic signals are then used to regenerate the optical image on, for example, a liquid crystal display (LCD).

More recently, however, CMOS image sensors have gained in popularity. Pure CMOS image sensors have benefited from advances in CMOS technology for microprocessors and ASICs and provide several advantages over CCD imagers. Shrinking lithography, coupled with advanced signal-processing algorithms, sets the stage for sensor array, array control, and image processing on one chip produced using these well-established CMOS techniques. Shrinking lithography should also decrease image-array cost due to smaller pixels. However, pixels cannot shrink too much, or they have an insufficient light-sensitive area. Nonetheless, shrinking lithography provides reduced metal-line widths that connect transistors and buses in the array.

Many image sensors utilize an electronic global shutter (GS) in which an image is captured by all of the pixels simultaneously (i.e., the integration of photo-electrons in the photodiode starts and stops at the same time for all pixels), and then the captured image is read out of the pixels, typically using a rolling shutter (RS) operation. Conventional CMOS image sensors that support GS operations include a Memory Node (MN) in each pixel that stores the image information (captured charge) until it is read out. That is, the image information (captured charge) generated in the photodiode of each pixel is transferred to and temporarily stored in the MN of each pixel, and then the captured charges are systematically (e.g., row by row) read out of the MN of each pixel (e.g., one row of pixels at a time) during the RS operation.

One possible way to reduce readout noise in global shutter pixel is to have an additional floating diffusion (FD) for each pixel, and reading out the captured charge using a correlated double sampling (CDS) readout operation. The CDS readout operation is perform by first resetting the FD and reading the reset (typically referred to as a sample-and-hold reset (SHR) signal value), and then transferring the captured charge from the pixel's MN to the pixel's FD and reading the image bit value (typically referred to as a sample-and-hold image (SHS) signal value). The CDS readout approach cancels out the kt/c associated with reset operations, which is otherwise dominant in low light. This noise reduction approach sets more strict design demands on the MN. Since the MN needs to optimized in a way that all the stored charge is transferred to the FD. The result of incomplete charge transfer is low light non-linearity and image lag.

There is an ongoing trend\demand to increase sensor resolution or to decrease pixel size. Decreasing the size of a global shutter pixel capable of CDS is impossible without compromising the active fill factor of the pixel due to the additional floating diffusion in each pixel and the associated control lines (typically four lines per row of pixels) that are required to support both GS image capture and rolling shutter CDS readout operations.

What is needed is an image sensor that supports GS image capture, utilizes low noise CDS readout operations, and facilitates higher resolution than that of conventional approaches by eliminating the need for disposing a floating diffusion in each pixel, and by reducing the number of control signals per pixel to less than four.

SUMMARY OF THE INVENTION

The present invention is directed to a novel method for operating a CMOS global shutter (GS) image sensor in which charges generated on the photodiode (referred to as a "captured charge") of each pixel during a GS image capture operation are sequentially read out as using shared floating diffusions during a rolling shutter (RS) readout operation. That is, each pixel of an associated pixel group includes a charge coupled gate (CCG) device (or other memory node) for storing the captured charge generated by that pixel's photodiode during the GS image capture operation, and the CCG devices of the group's pixels are operably coupled to the shared floating diffusion. During a first phase of the RS readout operation, a first captured charge, which was generated and stored in a first pixel in the pixel group during the GS image capture operation, is transferred from the first pixel to the shared floating diffusion, and a first CDS readout value is generated on an associated output signal line having a signal value reflecting the "size" of the first captured charge. Subsequently, during a second phase of the RS readout operation, a second captured charge, which was generated and stored in a second pixel in the pixel group during the GS image capture operation, is transferred to the shared floating diffusion, and a second CDS readout value is generated on an associated output signal line having a signal value reflecting the "size" of the second captured charge. By providing CCG devices that temporarily store a captured charge in each pixel and utilizing shared floating diffusions during the RS readout operation to sequentially read out the captured charges stored in multiple associated pixels, the present invention facilitates both GS image capture operations and low noise CDS readout operations, and also facilitates the production of GS image sensors having pixels with increased active fill factor by eliminating the need for a floating diffusion in each pixel (i.e., by reducing the area taken up by control circuitry in each pixel).

The GS image capture operation includes simultaneously generating a captured charge on every pixel during an integration phase in response to global control signals, and then transferring the captured charges to each pixel's CCG device during a transfer phase in response to global control signals. The integration phase involves coupling each photodiode to a voltage source during a pre-integration period, and then de-coupling the photodiodes of each of the plurality of pixels from the voltage source and electrically isolating said photodiode of each of the plurality of pixels during an integration period. In a specific embodiment, each CCG device is a three-phase charge transfer shift register circuit (i.e., similar to those used in charge coupled device (CCD) type image sensors) including three charge storage regions respectively controlled by three phase gates such that the storage of a captured charge in the charge storage regions is controlled by an associated phase gate. The transfer phase involves activating a transfer gate connected between the photodiode and a first charge storage region in the CCG device of each pixel, and activating a first phase gate of the CCG device in each pixels. Next, a second phase gate of the CCG device in each pixel is activated and the transfer gate in each pixel is deactivated. Finally, the first phase gate in each pixel is deactivated to store the captured charges in the charge trapping region associated with said second phase gate. In accordance with a specific embodiment, the control signal applied to the second phase gate is then reduced (e.g., by 50% or more) in pixel groups whose readout is delayed by several tens of microseconds (e.g., the lowermost pixel groups in a large array that is read out in a top-to-bottom pattern). According to an embodiment of the present invention, the CCG devices in the pixels of each pixel group are controlled by a small number of shared control lines, where corresponding phase gates of the CCG devices in each pixel are controlled by the same shared control line (e.g., the first phase gate of each CCG device, which is connected to the transfer gate in each pixel, is connected to a first shared phase control signal line). By controlling the CCG devices in all pixels of each pixel group using shared control signals, the number of control lines disposed between each row of pixels can be reduced to fewer than the four control lines that are required in conventional devices supporting both GS capture and CDS readout, thereby further enhancing the active fill factor of each pixel in improving the image sensor's efficiency to collect light.

According to a specific embodiment of the present invention, the multi-phase CCG devices of each pixel group are connected in series and controlled by shared phase control signals such that captured charges are shifted along the chain of CCG devices to the floating diffusion during the RS readout operation. That is, the end charge storage regions in each CCG device of a pixel group are connected and electrically coupled either to a first charge storage region in an adjacent CCG device or, in the case of the end (last) CCG device disposed in the last pixel of the chain, to the floating diffusion in a way that facilitates charge transfer from one CCG device to an associated adjacent CCG device (or the floating diffusion, in the case of the end CCG device). This chained CCG device arrangement facilitates both GS capture and RS readout operations that are controlled by minimal number of phase control signal lines (e.g., three phase control signal lines in the case of three-phase CCG devices), thereby further improving the image sensor's efficiency to collect light by minimizing the number of control lines per row of pixel groups.

BRIEF DESCRIPTION OF THE DRAWINGS

These and other features, aspects and advantages of the present invention will become better understood with regard to the following description, appended claims, and accompanying drawings, where:

FIGS. 5A, 5B, 5C, 5D, 5E, 5F, 5G, 5H and 5I are timing diagrams showing control signals utilized during integration, transfer and readout operations of the pixel group of FIG. 1;

FIGS. 6A and 6B are simplified circuit diagrams showing signal values and operating states applied to the pixel group of FIG. 1 during an integration phase of a global shutter image capture operation according to an exemplary embodiment of the present invention;

FIGS. 8A, 8B, 8C and 8D are simplified circuit diagrams showing signal values and operating states of the pixel group of FIG. 1 during a first CDS readout phase of a rolling shutter readout operation according to the exemplary embodiment of the present invention;

FIGS. 9A, 9B, 9C and 9D are simplified circuit diagrams showing signal values and operating states of the pixel group of FIG. 1 during a second CDS readout phase of a rolling shutter readout operation according to the exemplary embodiment of the present invention;

FIGS. 10A, 10B, 10C and 10D are simplified circuit diagrams showing signal values and operating states of the pixel group of FIG. 1 during a third CDS readout phase of a rolling shutter readout operation according to the exemplary embodiment of the present invention;

FIGS. 11A, 11B, 11C and 11D are simplified circuit diagrams showing signal values and operating states of the pixel group of FIG. 1 during a fourth CDS readout phase of a rolling shutter readout operation according to the exemplary embodiment of the present invention.

DETAILED DESCRIPTION OF THE DRAWINGS

The present invention relates to an improvement in global shutter image sensors. The following description is presented to enable one of ordinary skill in the art to make and use the invention as provided in the context of a particular application and its requirements. As used herein, directional terms such as "above", "below", "vertical", and "horizontal" are intended to provide relative positions for purposes of description, and are not intended to designate an absolute frame of reference. The terms "coupled" and "connected", which are utilized herein, are defined as follows. The term "connected" is used to describe a direct connection between two circuit elements, for example, by way of a metal line formed in accordance with normal integrated circuit fabrication techniques. In contrast, the term "coupled" is used to describe either an electrical (e.g., charge) coupling between two elements or nodes, or a physical direct or indirect connection between two circuit elements. For example, when used to denote physical direct/indirect connection between two elements, the two coupled elements may be directly connected by way of a metal line, or indirectly connected by way of an intervening circuit element (e.g., a capacitor, resistor, inductor, or by way of the source/drain terminals of a transistor). Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
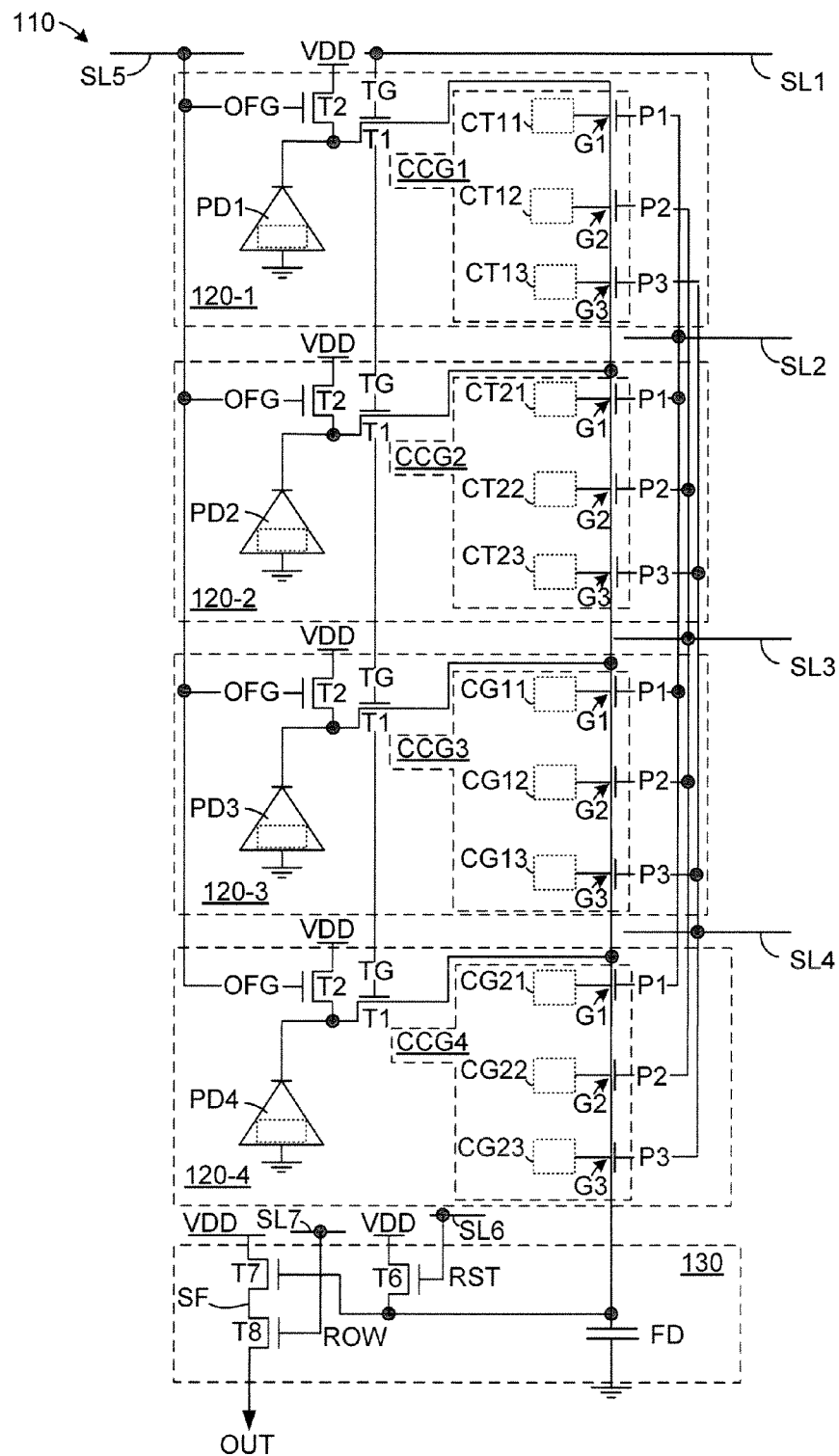
FIG. 1 is a simplified circuit diagram showing a pixel group of an image sensor according to an embodiment of the present invention.
Figure 3:
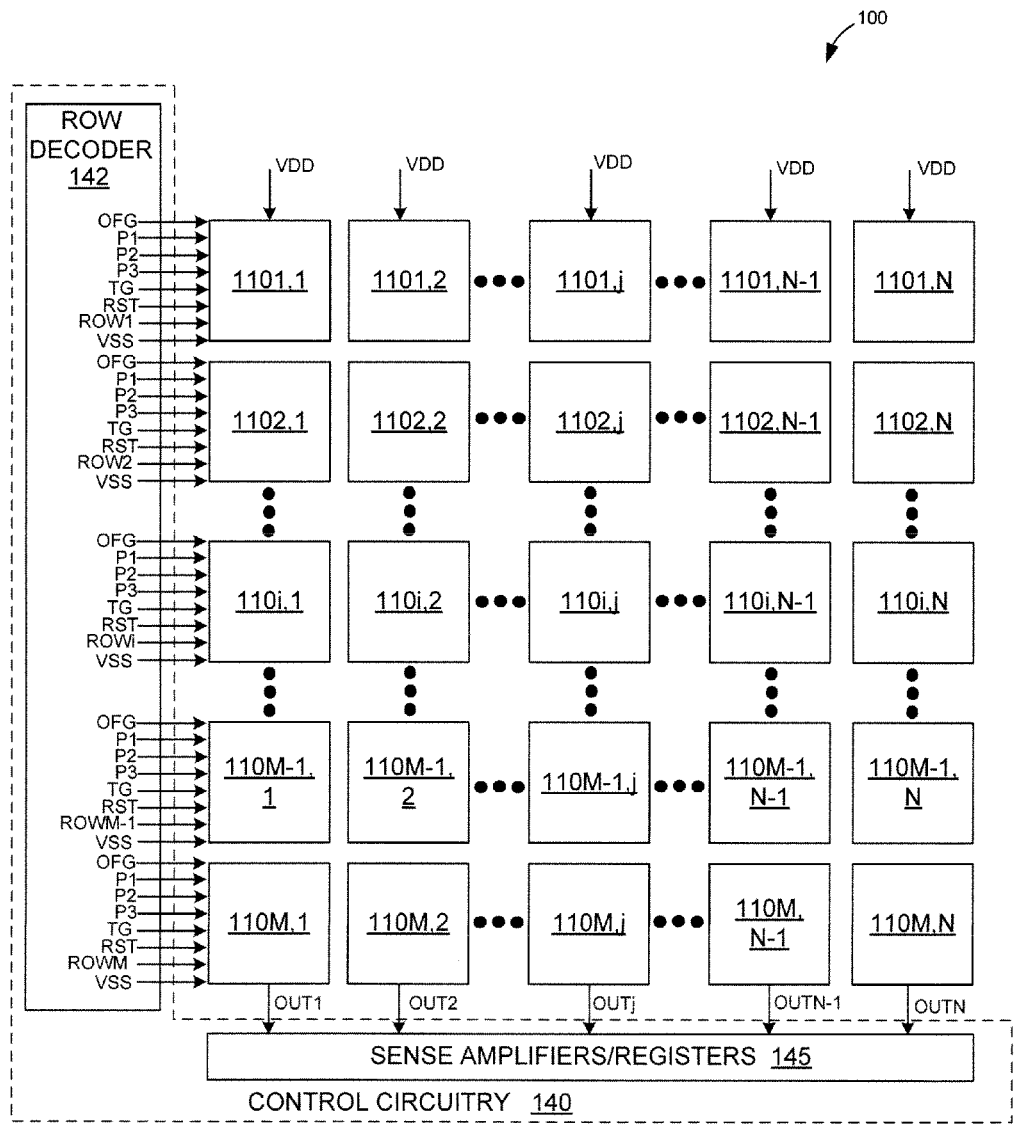
FIG. 3 is a simplified block diagram showing the image sensor of FIG. 1 in additional detail.

FIGS. 1 and 3 show a global shutter (GS) image sensor 100 according to an exemplary embodiment of the present invention, where FIG. 3 shows that image sensor 100 includes multiple pixel groups 1101,1 to 110M,N arranged in rows and columns, and FIG. 1 shows an exemplary pixel group 110 (i.e., each pixel group 1101,1 to 110M,N is formed with the circuit elements shown in FIG. 1).

According to an aspect of the present invention, each pixel group includes multiple pixels that are operably coupled to a shared readout circuit. Referring to FIG. 1, exemplary pixel group 110 includes four pixels 120-1 to 120-4 and a shared readout circuit 130. Any number of pixels may be utilized in each pixel group, but four pixels per pixel group are presently believed to be optimal for balancing the number of horizontal signal lines disposed between each row of pixels and the complexity of the interconnect structures required to implement the rolling shutter readout operation described below. Pixels 120-1 to 120-4 are preferably arranged in a column (i.e., with pixel 120-1 immediately above pixel 120-2 in the column, pixel 120-2 immediately above pixel 120-3, and pixel 120-3 immediately above pixel 120-4), and shared readout circuit 130 is preferably disposed at an end of pixels 120-1 to 120-4 (e.g., positioned immediately below pixel 120-4). This arrangement preference is based on layout considerations to support the rolling shutter readout operation described below. There are other constrains that favor using four (or fewer) pixels in each pixel group, the most important being associated with transfer efficiency. That is, a typical modern CCD achieves a charge transfer efficiency (CTE) of 99.9999%, and the number of lost electrons lost from each charge packet Q transmitted from N CCD pixels in a pixel group is equal to Q×(CTE^N). This means that if each charge packet includes about 10K electrons (i.e., Q=10K) and each pixel group includes 800 CCD pixels (i.e., N=800), then the number of pixels lost will be only 8 electrons. In contrast to CCDs, with low voltage CMOS image sensors it is difficult to achieve CTE numbers greater than 99.99. %, which significantly increases meaning that a CMOS image sensor having pixel groups including 800 pixels, the loss during transmission of 10K electron packets would be approximately 5K electrons, which of course would be completely impractical. On the other hand, the lower CTE associated with CMOS image sensors becomes insignificant when the number of pixels in each pixel group is reduced to, for example, four (i.e., the transfer of 10K electron packets in a four pixel group yields a loss of about four electrons, which is acceptable). Another problem that can occur in larger pixel groups is vertical blooming.

According to another aspect of the invention, each pixel includes a photodiode, a charge coupled gate (CCG) device, and a transfer gate connected between the CCG device and the photodiode. Referring to the exemplary embodiment shown in FIG. 1, pixels 120-1 to 120-4 respectively include photodiodes PD1 to PD4, CCG devices CCG1 to CCG4, and transfer gates T1 that are respectively connected between each corresponding pair of photodiodes PD1 to PD4 and CCG devices CCG1 to CCG4 in each pixel 120-1 to 120-4. In one embodiment photodiodes PD1 to PD4 are fully-pinned photodiodes formed in accordance with known CMOS (image sensor) fabrication techniques such that they are capable of generating a captured charge (sometimes referred to as a "charge packet") proportional to an amount of light received during an integration (first) phase of a global shutter operation, which is described below. All four transfer gates T1 of pixels 120-1 to 120-4 comprise NMOS transistors that are controlled by a common (single) transfer gate control signal TG that is transmitted on a shared signal line SL to pixel group 110, whereby when control signal TG is asserted, all four transfer gates T1 shown in FIG. 1 turn on simultaneously to pass (all) captured charge from an associated photodiode PD1 to PD4 to an associated CCG device CCG1 to CCG4 (e.g., in pixel 120-1, transfer gate T1 passes a captured charge from photodiode PD1 to CCG device CCG1). Similarly, when control signal TG is de-asserted, all four transfer gates T1 shown in FIG. 1 are turned off to simultaneously isolate photodiodes PD1 to PD4 from CCG device CCG1 to CCG4.

According to another aspect of the present invention, each CCG device CCG1 to CCG4 comprises a multi-phase charge transfer shift register circuit including multiple charge storage regions respectively controlled by associated phase gates such that the storage of the captured charge in the charge storage region is controlled by phase signals supplied to the phase gates. For example, CCG device CCG1 (pixel 120-1) includes charge storage regions CT11, CT12 and CT13 that are respectively controlled by phase gates G1, G2 and G3G3, whereby a captured charge is stored in one of charge storage regions CT11, CT12 and CT13 in accordance with phase signals P1, P2 and P3 respectively applied to phase gates G1, G2 and G3G3. As set forth in the examples below, a captured charge is transferred through charge storage region CT11 into charge storage region CT12 during a transfer phase of the global shutter operation, and the transferred from charge storage region CT12 and charge storage region CT13 during the subsequent rolling readout operation. Similarly, CCG device CCG2 includes charge storage regions CT21, CT22 and CT23 that are respectively controlled by associated phase gates G1, G2 and G3G3 in pixel 120-2, CCG device CCG3 includes charge storage regions CG11, CG12 and CG13 that are respectively controlled by associated phase gates G1, G2 and G3G3 in pixel 120-3, and CCG device CCG4 includes charge storage regions CG21, CG22 and CG23 that are respectively controlled by associated phase gates G1, G2 and G3G3 in pixel 120-4. Note that corresponding phase gates in the CCG devices of each pixel group are connected to common control signal lines that carry phase control signals P1, P2 and P3. For example, gate terminals of phase gates G1 of each of CCG devices CCG1 to CCG4 are connected to a shared control signal line SL2 that transmits phase signal P1 to pixel group 110, gate terminals of phase gates G2 of each charge coupled gate device CCG1 to CCG4 are connected to a shared control signal line SL3 carrying phase signal P2, and gate terminals of phase gates G3G3 of each charge coupled gate device CCG1 to CCG4 are connected to a shared control signal line SL4 carrying phase signal P3. With this arrangement, phase transistors G1 in all four CCG device CCG1 to CCG4 are turned on and off simultaneously by way of control signal P1, phase transistors G2 in all four CCG device CCG1 to CCG4 are turned on and off simultaneously by way of control signal P2, and phase transistors G3G3 in all four CCG device CCG1 to CCG4 are turned on and off simultaneously by way of control signal P3.

As shown in FIG. 1, CCG devices CCG1 to CCG4 are connected to receive captured charges from photodiodes PD1 to PD4, respectively, and are also connected to form a larger shift register for transferring captured charges to floating diffusion FD of readout circuit 130. That is, the "upper" (first) charge storage regions CT11, CT21, CG11 and CG21 of CCG devices CCG1 to CCG4 are respectively coupled by way of associated transfer gates T1 to receive captured charges from photodiodes PD1 to PD2 during the transfer phase of the global shutter operation (described below), the "middle" (second) charge storage regions CT12, CT22, CG12 and CG22 of CCG devices CCG1 to CCG4 are respectively connected between the upper charge storage regions CT11, CT21, CG11 and CG21 and an associated "lower" charge storage region CT13, CT23, CG13 or CG23. Note that each "lower" (third) charge storage regions CT13, CT23, CG13 and CG23 of each CCG device CCG1 to CCG4 is connected either to the "upper" charge storage region of an adjacent CCG device or to floating diffusion FD. Specifically, charge storage region CT13 of CCG device CCG1 is connected to charge storage region CT21 of CCG device CCG2, charge storage region CT23 of CCG device CCG2 is connected to charge storage region CG11 of CCG device CCG3, charge storage region CG13 of CCG device CCG3 is connected to charge storage region CG21 of CCG device CCG4, and charge storage region CG23 of CCG device CCG4 is connected to floating diffusion FD, whereby CCG devices CCG1 to CCG4 form an elongated charge transfer shift register circuit that facilitates the sequential transfer of four captured charges from pixels 120-1 to 120-4 to floating diffusion FD during the rolling shutter readout operation (discussed below).

Figure 2A:
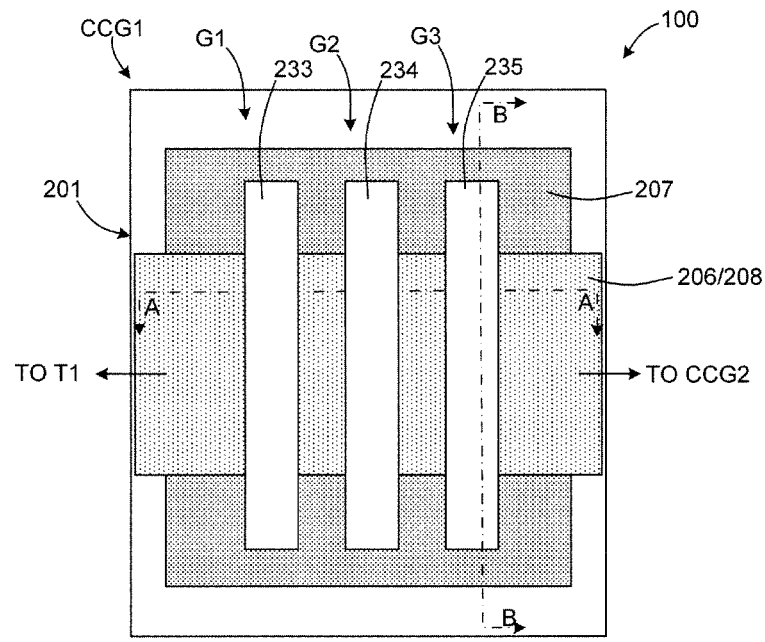
FIGS. 2A, 2B, and 2C are top, cross-sectional front elevation and cross-sectional side elevation views showing an exemplary CCG device utilized in each pixel of the image sensor of FIG. 1.
Figure 2B:
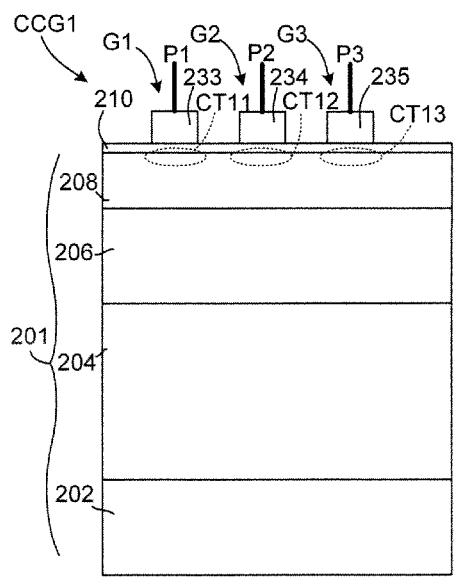
Figure 2C:
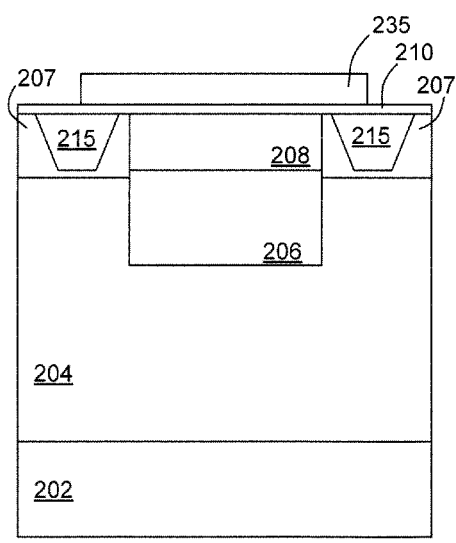

FIGS. 2A to 2C shows CCG device CCG1 in additional detail according to a preferred embodiment of the present invention, where FIG. 2A is a top view and FIGS. 2B and 2C are cross-sectional side and end views taken along section lines B-B and C-C, respectively. Note that CCG device CCG1 is substantially identical to CCG devices CCG2 to CCG4 in each pixel group. Referring to FIG. 2B, CCG device CCG1 is fabricated on a silicon substrate 201 that is processed using known CMOS fabrication techniques to include a p++ diffusion region 202, a p– epi layer region 204 formed over p++ region 202, a p+ photo-electron barrier implant 206 formed over epi layer region 204, and an elongated n-buried channel implant 208 formed over barrier implant 206. Buried channel implant 208 is formed by an n-type implant region located beneath the Si/SiO$_2$ interface between substrate 201 and a silicon dioxide gate oxide layer 210 (i.e., between barrier implant 206 and the substrate surface of substrate 201), and is formed such that a potential minimum is formed a few nanometers below the Si/SiO$_2$ interface. That is, buried channel region 208 is formed such that there is a few kT barrier between the potential minimum and the potential at the Si/SiO$_2$ interface, which prevents electrons from interacting with the traps formed at the Si/SiO$_2$ interface and thus increases charge transfer efficiency (CTE). Photo-electron barrier implant 206 provides a p+ region below buried channel implant 208 that serves to prevent electrons from collecting in buried channel implant 208. Phase gates G1, G2 and G3G3 are thus formed by spaced-apart polycrystalline silicon (polysilicon) gate electrodes 233, 234 and 235, which are patterned on gate oxide (SiO$_2$) layer 210, and corresponding underlying portions of buried channel region 208 (indicated by dashed-line ovals in FIG. 2B) that form charge trapping regions CT11, CT12 and CT13. Electrodes 233, 234 and 235 are preferably formed using the first poly layer of a compatible CMOS fabrication process, with a minimum spacing (e.g., 0.2 microns when using a 0.18 µm process technology) between adjacent poly gate structures. As indicated in FIG. 2B, electrodes 233, 234 and 235 are connected to shared signal lines carrying control signals P1, P2 and P3, respectively, by way of known metallization techniques. Referring to FIGS. 2A and 2C, a pixel well/channel stop implant 207 is formed along the sides of buried channel region 208, and surface trench isolation (STI) structures 215 are formed along the peripheral edges of polysilicon gate electrodes 233, 234 and 235 to electrically isolate the transistor channels. CCG device CCG1 is thus similar to that used in a conventional three-phase charge coupled device, where phase gate G1 controls the storage of a charge in charge trapping regions CT11 in accordance with phase control signal P1, phase gate G2 controls the storage of a charge in charge trapping regions CT12 in accordance with phase control signal P2, and phase gate G3G3 controls the storage of a charge in charge trapping regions CT13 in accordance with phase control signal P3. This arrangement, in conjunction with floating diffusion FD of readout circuit 130 (see FIG. 1), facilitates the use of pixels 120-1 to 120-4 to form a novel GS image sensor with true correlated double sampling readout operations (described below). Although the present invention is described with specific reference to pixels utilizing the three-phase CCG device shown in FIGS. 2A-2C, the present invention may be modified to utilize other 3-phase CCG device types as well, and may also be modified to utilize four-phase or virtual-phase CCG devices.

Referring again to FIG. 1, according to the exemplary embodiment each pixel 120-1 to 120-4 also includes an overflow gate transistor T2 connected between the pixel's photodiode and system voltage VDD (e.g., overflow gate transistor T2 pixel 120-1 is connected between photodiode PD1 and voltage supply VDD). Overflow gate transistors T2 serve to reset photodiodes PD1 to PD4 prior to the start of integration, to control charge overflow to VDD during integration and storage, and also to evacuate the CCG devices as set forth below. Similar to transfer gates T1, all four overflow gate transistors T2 of pixels 120-1 to 120-4 are controlled by a common (single) control signal OFG that is transmitted on a single signal line SL5. That is, when control signal OFG is asserted, all four transistors T2 shown in FIG. 1 are turned on to simultaneously couple photodiodes PD1 to PD4 to voltage source VDD, and when control signal OFG is de-asserted, all four transistors T2 shown in FIG. 1 are turned off to simultaneously isolate photodiodes PD1 to PD4 from voltage source VDD.

Referring to the lower portion of FIG. 1, according to another aspect of the present invention, shared readout circuit 130 includes a floating diffusion FD that is coupled to CCG devices CCG1 to CCG4 of pixels 120-1 to 120-4 such that captured charges can be sequentially transferred to floating gate diffusion FD during a rolling shutter readout operation. In the present embodiment, this charge coupling is achieved by an operable connection between charge trapping region CG23 (i.e., phase transistor G3G3 of CCG device CCG4) and floating diffusion FD such that a charge can be transferred from charge trapping region CG23 to floating diffusion FD during the charge transfer operations described below.

According to yet another aspect of the disclosed embodiment, CCG devices CCG1 to CCG4 are operably connected in a "4×1" (vertical) sharing scheme that facilitates charge coupling between pixels 120-1 to 120-4 during the charge transfer operations. That is, CCG device CCG1 is disposed adjacent to charge device CCG2 such that charge trapping region CT13/phase transistor G3G3 of CCG device CCG1 is both physically connected and electrically coupled to charge trapping region CT21/phase transistor G1 of CCG device CCG2, whereby a charge is transferable from trapping region CT13 to trapping region CT21 in the manner described below. Similarly, CCG device CCG2 is disposed adjacent to charge device CCG3 such that charge trapping region CT23/phase transistor G3G3 of CCG device CCG2 coupled to charge trapping region CG11/phase transistor G1 of CCG device CCG3, and CCG device CCG3 is disposed adjacent to charge device CCG4 such that charge trapping region CG13/phase transistor G3G3 of CCG device CCG3 coupled to charge trapping region CG21/phase transistor G1 of CCG device CCG4. As set forth below, this "4×1" sharing scheme arrangement facilitates the sequential transfer of captured charges from CCG devices CCG1 to CCG4 to floating gate diffusion FD using a charge "shift register" operation in which the captured charges are shifted downward along the column to floating diffusion FD. In another possible embodiment, the "4×1" (vertical) sharing scheme of FIG. 1 may be replaced with a "1×4" (horizontal) sharing scheme, or a scheme in which CCG devices CCG1 to CCG4 are coupled in parallel to floating diffusion FD, e.g., by way of associated transfer gates, but this approach would increase the number of control signal lines. Other sharing schemes are also possible, for example by changing the number of pixels in each vertical or horizontal sharing group (e.g., forming N×1 or 1×N sharing schemes), or by forming sharing groups having pixels arranged in a 2×2 pattern (which would be very desirable in terms of charge binning), or an N×N pattern.

In accordance with the exemplary embodiment shown in FIG. 1, shared readout circuit 130 also includes a reset transistor T6, a source-follower transistor T7 and a row select transistor T8. Reset transistor T6 is connected between system voltage VDD and floating diffusion FD, and is controlled by a reset control signal RST transmitted on a sixth horizontal signal line SL6 to reset floating diffusion FD during readout (as described below). In one embodiment reset transistor T6 is also utilized in conjunction with overflow gate transistors T2 in each pixel 120-1 to 120-4 at the beginning of sensor operation to evacuate charge from the CCG chain formed by CCG devices CCG1 to CCG4 (this evacuation is achieved by activating reset transistor T6 and overflow gate transistors T2 and performing a few dummy readout sequences). The voltage stored on floating diffusion FD is applied to a gate terminal of source-follower transistor T7 to generate a source-follower output voltage SF that is supplied to row select transistor T8. Row select transistor T8 is controlled by a row control signal ROW that is transmitted on a seventh horizontal signal line SL7 to transfer source-follower output voltage SF to a vertical signal line, whereby pixel group output signals OUT are transmitted to sense amplifiers located along the edge of the pixel group array (described below with reference to FIG. 3).

FIG. 3 is a block diagram showing image sensor 100 in additional detail, wherein pixel groups 1101,1 to 110M,N are depicted as blocks arranged in an array of horizontal rows and vertical columns, and control circuitry 140 is disposed along a peripheral edge of the array. As set forth above, each pixel group 1101,1 to 110M,N includes circuitry consistent to that of pixel group 100 shown in FIG. 1. In accordance with an aspect of the present invention, each row of pixel groups (e.g. the uppermost row including pixel groups 1101,1 to 1101,N) is controlled by eight or fewer control signals generated by row control circuit 142 (i.e., control signals OFG, P1, P2, P3, TG, RST, ROWx, and an optional second system voltage VSS that is utilized in instances where the ground connection for each pixel is inadequate). Similar to conventional image sensors, output values OUT1 to OUTN are generated by each column during readout. Because these eight control signals are shared by four pixels in each pixel group of each row, only two control lines are disposed between each horizontal row of pixels (in comparison to four control lines required in conventional GS image sensors having CDS capabilities), thereby facilitating a closer spacing between the pixels and, thus, producing a higher resolution image sensor. When arranged correctly (i.e., when the pixels are formed with a minimum of internal routing disposed in the interconnect layer between the silicon surface and the M1 metallization layer), the optical openings above the pixels are not compromised by the inter-pixel signal line routing. Similar to conventional image sensors, pixel group output signals OUT1 to OUTN are transmitted along vertical readout signal lines to sense amplifiers/registers circuit 145 for detection utilizing known techniques.

Figure 4:
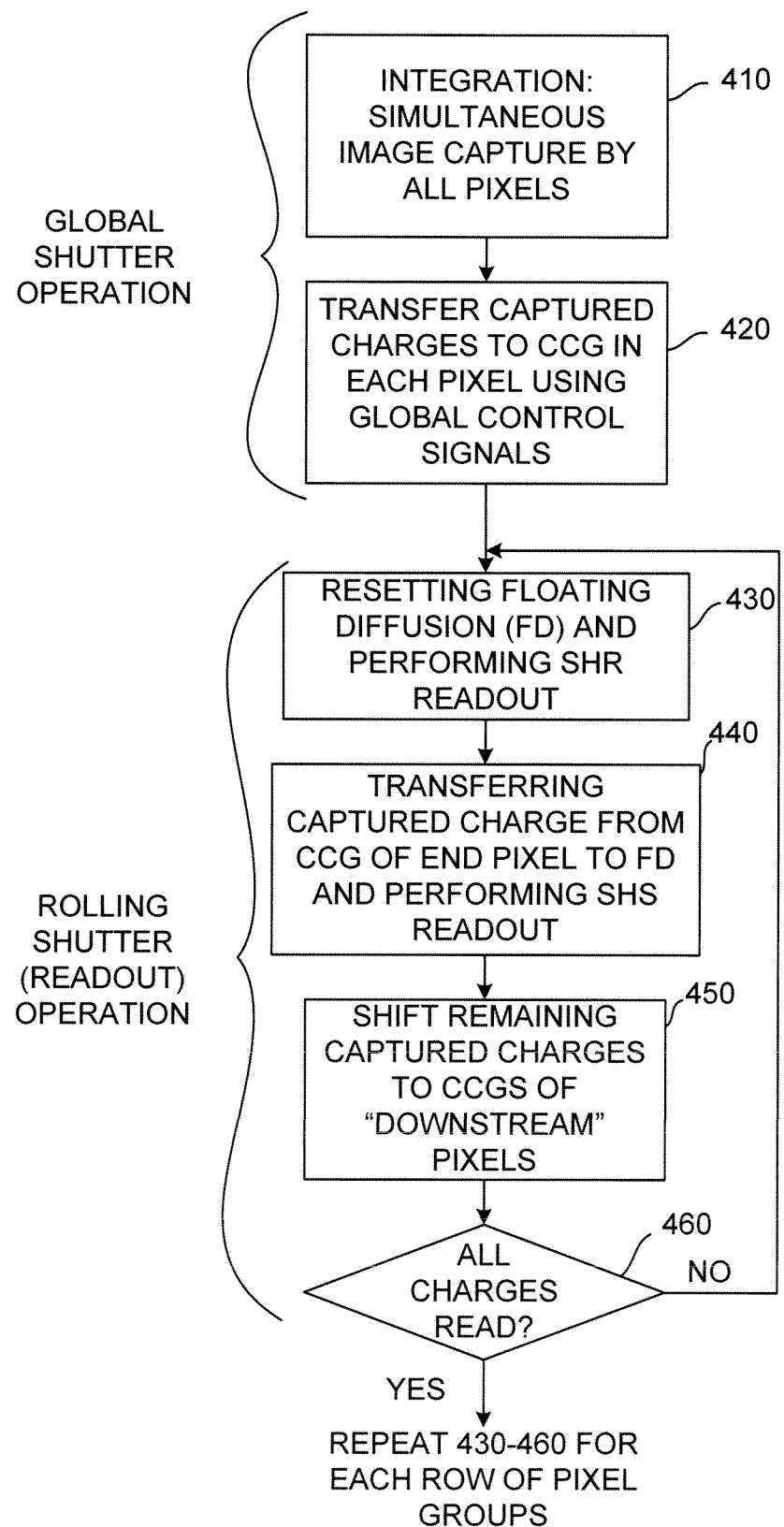
FIG. 4 is a flow diagram showing a generalized method for operating the image sensor of FIG. 1 according to an aspect of the present invention.
Figure 7A:
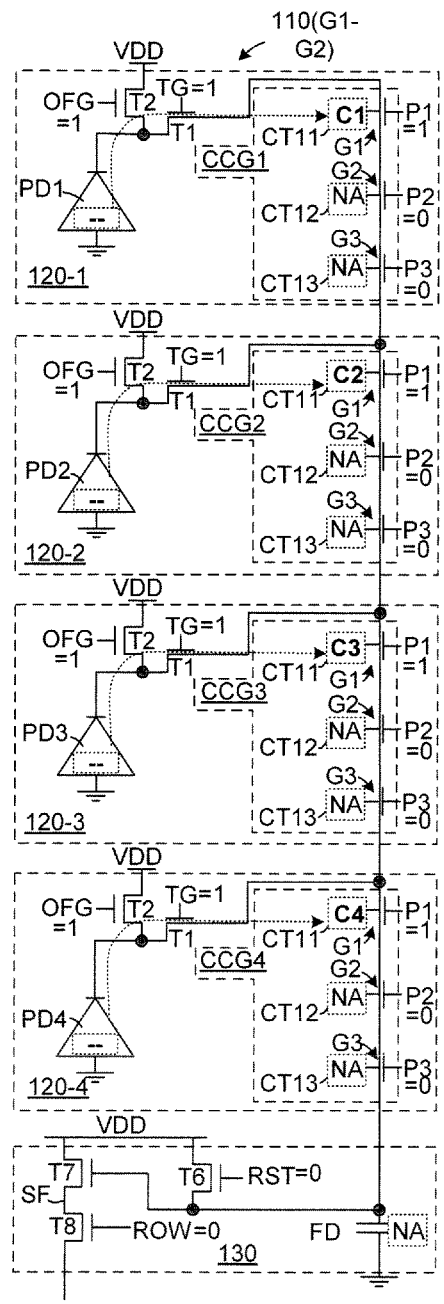
FIGS. 7A and 7B are simplified circuit diagrams showing signal values and operating states applied to the pixel group of FIG. 1 during a charge transfer phase of a global shutter image capture operation according to the exemplary embodiment of the present invention.
Figure 7B:
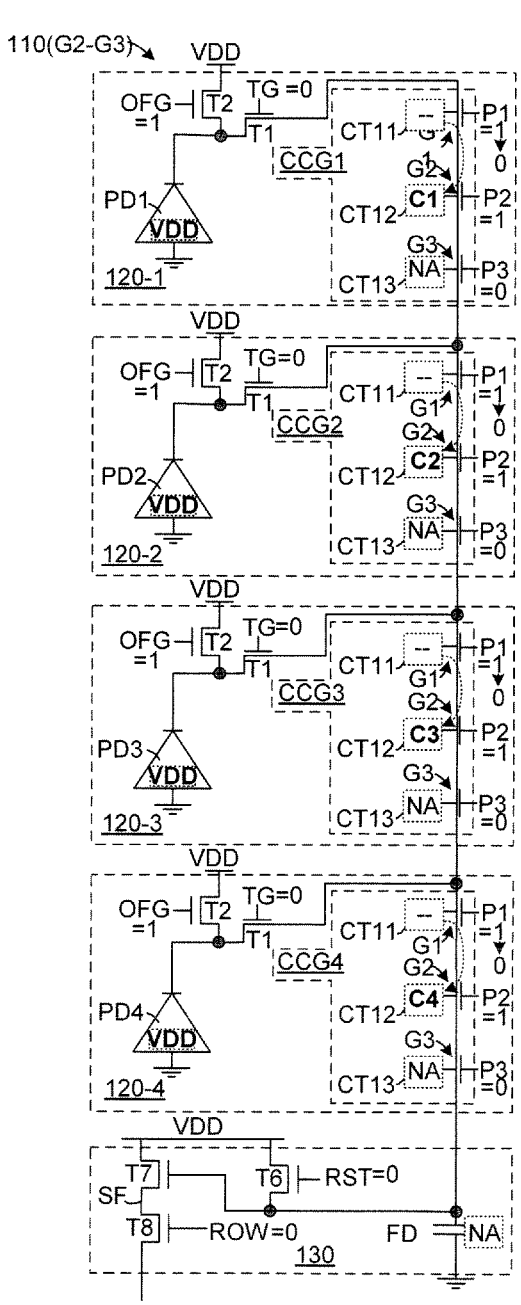

FIG. 4 is a simplified flow diagram depicting a generalized method for operating image sensor 100 as a low noise GS image sensor utilizing control circuit 140 (see FIG. 3) according to another embodiment of the present invention. The method generally includes a global shutter operation (blocks 410 and 420) and a rolling shutter readout operation (blocks 430-460). As set forth below, various combinations of the features associated with the rolling shutter readout operation may be used in combination with the global shutter operation to produce valuable operating methods that are believed fall within the novel characteristics of the present invention. For example, although the generalized method described below describes separate sample-and-hold reset (SHR) and sample-and-hold image (SHS) operations utilized to perform CDS readout operations, the use of a shared readout circuit by several pixels may be utilized without performing the SHR portion of the CDS readout operation. Further, although the generalized method includes shifting captured charges between CCG devices during the readout operation, other approaches may be utilized to transfer the captured charges to the shared readout circuit in each pixel group.

Referring to the upper portion of FIG. 4, the global shutter operation of the method includes an integration phase (block 410) during which all of pixels of the image sensor are controlled using global signals such that the photodiode of each pixel simultaneously captures a corresponding charge, and a subsequent transfer phase (block 420) in which all of the pixels are controlled such that the captured charges are simultaneously transferred from the photodiode to the CCG device in each pixel. Additional detail regarding the specified global shutter operation as performed by pixel group 110 (see FIG. 1) are provided below with reference to FIGS. 5A-5D, 6A-6B and FIGS. 7A-7B.

Referring to the lower portion of FIG. 4, after the global shutter readout operation is completed, the rolling shutter readout operation is performed on one row of pixel groups at a time and is repeated until captured charges are read from every row (e.g., with reference to FIG. 3, the readout operation is performed on the uppermost row including pixel groups 1101,1 to 1101,N first, then the readout operation is performed on the second row including pixel groups 1102,1 to 1102,N, etc., until captured charges are read from every pixel of image sensor 100). During each row readout operation, all pixel groups in each row of the image sensor are controlled using rolling shutter control signals (i.e., these control signals are only sent to the row currently being read), and in the generalized method embodiment includes (block 430) resetting the floating diffusion and transmitting a first SHR value onto a shared output signal line, and then (block 440) transferring a first captured charge to the floating diffusion and transmitting a first SHS value. As indicated by block 460 in FIG. 4, this sequence of reset/SHR read/transfer captured charge/SHS read is repeated for each captured charge stored in pixels of the currently-being-read pixel group (e.g., pixel group 1101,1 in FIG. 3), whereby multiple CDS readout operations are performed during which multiple SHR and multiple SHS values are transmitted from a single shared readout circuit onto an associated output signal line (e.g., output signal line OUT1 in FIG. 3). As indicated below block 460, once the readout process is completed for the "current" row (e.g., the uppermost row in FIG. 3), the reset/SHR read/transfer captured charge/SHS read sequence is repeated by transmitting rolling shutter control signals only to the pixel groups of the next sequential row of pixel groups (e.g., the row including pixel groups 1102,1 to 1102,N in FIG. 3), whereby multiple CDS readout operations are performed during which a second series of SHR and multiple SHS values are transmitted from another shared readout circuit (e.g., that of pixel group 1102,1 in FIG. 3) onto an associated output signal line (e.g., output signal line OUT1 in FIG. 3). This process is then repeated for each row of pixels until all of the captured charges from every pixel of the image sensor have been read out.

Referring to block 450 of FIG. 4, according to a specific embodiment of the present invention, while a first captured charge is being transferred from the CCG device of an "end" pixel (e.g., from CCG device CCG4 of pixel 120-4, see FIG. 1) to the floating diffusion FD of the shared readout circuit, a second captured charge is shifted from the CCG device of a penultimate pixel into the CCG device of the end pixel (e.g., the captured charge generated in pixel 120-3 is transferred from CCG device CCG3 to CCG device CCG4 by way of the connection between phase gate G3G3 of device CCG3 and phase gate G1 of device CCG4. This shifting operation utilizes the connection between CCG devices CCG1 to CCG4 to facilitate operation of these devices as a shift-register-type device that shifts the four captured charges to the shared readout circuit using a minimum of shared control signals. A more detailed example of this feature and additional details regarding the specified rolling shutter readout operation as performed by pixel group 110 (see FIG. 1) are provided below with reference to FIGS. 5D-5I, 8A-8D, 9A-9D, 10A-10D, and 11A-11D.

FIGS. 5A-5I are timing diagrams showing control signals OFG, TG, P1, P2, P3, RST, ROW, SHR and SHS utilized during an exemplary portion of a global shutter image capture operation performed by image sensor 100 (FIGS. 1 and 3) in accordance with a specific embodiment of the present invention. Specifically, FIGS. 5A-5G respectively show the operating state of control signals OFG, TG, P1, P2, P3, RST and ROW, which are transmitted to a selected row of pixel groups 110 of image sensor 100 (e.g., the uppermost row including pixels 1101,1 to 1101,N in FIG. 3) during the global shutter operation and the beginning the rolling shutter readout operation. Note that global control signals (i.e., control signals simultaneously transmitted to all pixel groups of array 100) are identified in FIGS. 5A-5G with the letter "G", and rolling shutter control signals (i.e., signals transmitted only to a selected pixel group row) are identified in FIGS. 5A-5H with the letter "R". Notice that control signals P1 and P2 have changing modes (i.e., from global to rolling), and that all other signals are either global or rolling. Note also that control signals SHR and SHS (FIGS. 5H and 5I) are generated by control circuitry 140 and applied to sense amplifiers/registers circuit 145 (see FIG. 3). FIGS. 6A-11D are simplified circuit diagrams showing the operating states of the various transistors of exemplary pixel group 110 (described above with reference to FIG. 1) in accordance with the control signals shown in FIGS. 5A-5G. In these figures, a suffix provided after reference numeral "110" indicates the state (i.e., high "1" or low "0") of each control signal TG, OFG, RST and ROW, and each phase signal P1, P2 and P3 (i.e., referring to the top of FIG. 6A, the reference numeral "110(t0-t1)" means that pixel group 110 is shown with the control signal states as generated between time t0 and t1 in the timing diagrams of FIGS. 5A-5I).

Referring to FIG. 5A, the global shutter operation begins with a pre-integration phase during which global control signal OFG is asserted between time t0 and time t1 (all other signals are de-asserted). As indicated by group 110(t0-t1) in FIG. 6A, this control signal combination causes overflow gate transistor T2 of every pixel in image sensor 100 to turn on, thereby coupling every photodiode to system voltage VDD. All other transistors of pixel group 100 remain off during this period.

Referring to FIG. 5B and to group 110(t1-t2), which is shown in FIG. 6B, an integration phase begins at time t1 by de-asserting global control signal OFG, thereby turning off overflow gate transistor T2 to isolate the photodiode in every pixel in image sensor 100. For example, referring to pixel 120-1 at the upper portion of FIG. 6B, because both overflow gate transistor T2 and transfer gate T1 remain turned off, a charge C1 collects on photodiode PD1 in proportion to an amount of light directed onto photodiode PD1. Similarly, charges C2, C3 and 04 respectively collect on photodiodes PD2, PD3 and PD4 in pixels 120-2, 120-3 and 120-4.

The subsequent transfer of captured charges C1-C4 to CCG devices CCG-1 to CCG-4 will now be described with reference to FIGS. 5A to 5D and FIGS. 7A and 7B. The integration in photodiodes PD1 to PD4 (and all remaining photodiodes in the array) ends at time t2 when transfer gate signal TG is activated (see FIG. 5B). To transfer captured charges C1 to C4 into CCG devices CCG1 to CCG4, transfer gate T1 and phase gates G1 and G2 are turned on by asserting phase signal P1 at time t3 (FIG. 5C) and both turning off signal TG transfer gate and asserting of phase signal P2 at time t4 (FIGS. 5B and 5D). As depicted by group 110(t3-t4) in FIG. 7A, this operating state transfers captured charge C1 from photodiode PD1 through transfer gate T1 of pixel 120-1 to charge trapping region CT11 of CCG device CCG1, transfers captured charge C2 from photodiode PD2 to charge trapping region CT21 of CCG device CCG2, transfers captured charge C3 from photodiode PD3 to charge trapping region CG31 of CCG device CCG3, and transfers captured charge C4 from photodiode PD4 to charge trapping region CG21 of CCG device CCG4. As depicted by group 110(t4-t5) in FIG. 7B, when phase signal P2 is fully activated at time t4 and transfer gate signal TG is de-activated (shown in FIG. 5B), captured charge C1 transfers from charge trapping region CT11 to charge trapping region CT12 CCG device CCG1, captured charge C2 transfers from charge trapping region CT21 to charge trapping region CT22 in CCG device CCG2, captured charge C3 transfers from charge trapping region CG31 to charge trapping region CG32 in CCG device CCG3, and captured charge C4 transfers from charge trapping region CG21 to charge trapping region CG22 in CCG device CCG4. Subsequently, global control signal OFG is re-asserted and phase signal P1 is de-activated at time t5 (FIGS. 5A and 5C). Now all captured charges C1 to C4 are located under phase gates G2 in each CCG device CCG1 to CCG4. The transfer of the captured charges is done globally for the entire array. As indicated in FIG. 5D, in accordance with a preferred embodiment, when readout from a particular pixel group is delayed by a few tens of microseconds (e.g., in pixel groups located in the middle to bottom of an image sensor having 200 vertically arranged pixel groups that are read out in a "top-to-bottom pattern), phase signal P2 voltage is reduced at time t6 such that the charges are stored using a lower voltage than the voltage used for transfer. In one practical example using a 3.3V process, the CCG structure is formed with a 70 A gate oxide, the transfer voltage is 3.45V, and the storage voltage is 1V. Alternatively, when a 5V process is used, the CCG structure is formed with a 100 A gate oxide, the transfer voltage is 5.5V, and the storage voltage is 1V. For illustrative purposes, the reduced voltage is indicated in FIGS. 8A-11D as "½". As indicated by the dashed line in FIG. 5D, this voltage reduction may be omitted when the readout delay is on the order of a few microseconds (e.g., in the upper few pixel groups of the 200 group image sensor mentioned above).

Referring to FIG. 5G, row select signal ROW is activated at time t7, which turns on row select transistor T8 (see FIG. 8A) to the associated vertical signal line. Row select signal ROW remains active during all four CDS readout phases described below, where a first CDS readout phase is described with reference to FIGS. 8A-8D, a second CDS readout phase is described with reference to FIGS. 9A-9D, a third CDS readout phase is described with reference to FIGS. 10A-10D, and a fourth CDS readout phase is described with reference to FIGS. 11A-11D.

Figure 8A:
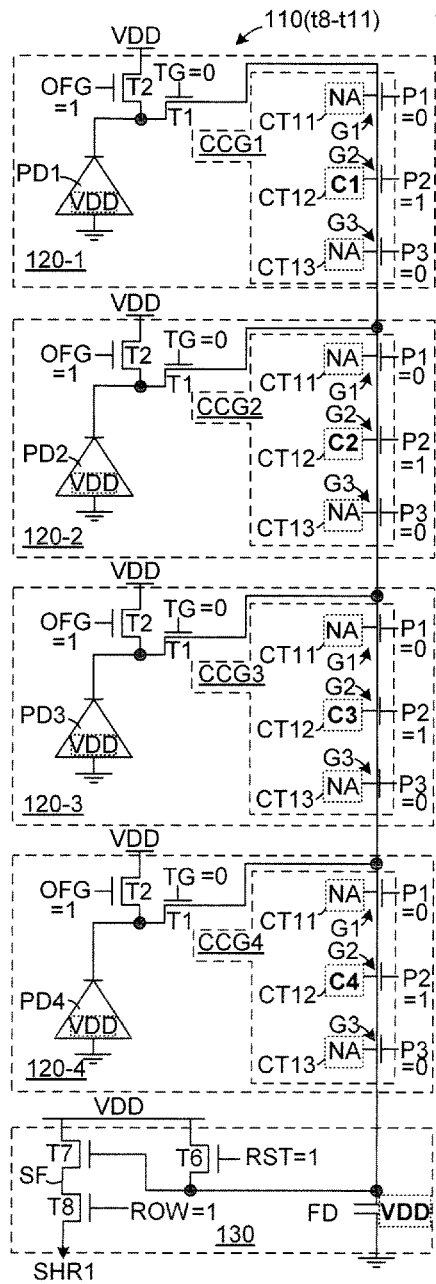

FIG. 8A shows group 100(t8-t11) including an operating state during the SHR portion of the first CDS readout phase. This readout phase portion begins when control signal SHR is activated at time t8 (FIG. 5H) to prepare the appropriate sense amplifier/registers (not shown) for reading out first SHR values from the readout circuits of all pixel groups in the first row. The reset signal RST is then asserted at time t9 (FIG. 5F), and as indicated in FIG. 8A, the asserted reset signal RST turns on reset transistor T6 to couple floating diffusion FD to system voltage VDD, whereby source follower T7 is fully turned on to generate a first SHR value SHR1 (shown at the bottom of FIG. 8A) that is passed through row select transistor G2 onto the associated output signal line. The first SHR value is sampled between times t9 and t10 after an appropriate settling period. Reset signal RST is subsequently de-asserted at time t10 (FIG. 5F), which turns off reset transistor T6 to again isolate floating diffusion FD from system voltage VDD, and control signal SHR is de-asserted at time t11 (FIG. 5H). Note that charges C1-C4 remain stored in charge trapping regions CT12-CG22, respectively, due to the phase signal P2 applied on all four phase gates G2 of CCG devices CCG1-CCG4.

Figure 8B:
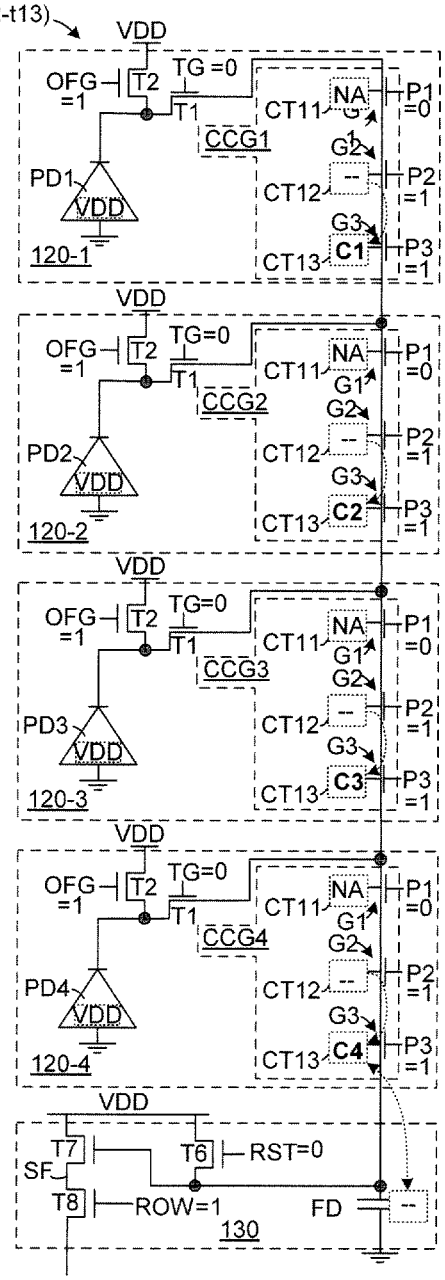

FIG. 8B shows group 100(t12-t13) including an operating state at the beginning of the SHS portion of the first CDS readout phase. This readout phase portion begins when phase signal P3 is asserted at time t12 (FIG. 5E), which activates phase gate G3G3 such that captured charges C1-C4 shift from "penultimate" charge trapping regions CT12-CG22 of CCG devices CCG1-CCG4, respectively, into "end" charge trapping regions CT13-CG23 of CCG devices CCG1-CCG4, respectively. This charge transfer, which is depicted by the dash-lined arrows in FIG. 8B, is completed when phase signal P2 is de-asserted at time t13 (FIG. 5D). Note that storage of captured charge C4 is now shared by charge trapping region CG23 of CCG device CCG4 and floating diffusion FD, as indicated by the double-arrow dash-line at the bottom of FIG. 8B. That is, because the potential in floating diffusion FD is much lower than the potential in charge trapping region CG23, the charge packet in charge trapping region CG23 flows to floating diffusion FD. In reality, complete transfer of the charge packet will be difficult to achieve, so some of the electrons will flow to floating diffusion FD and some will stay in charge trapping region CG23 until the potential of these two nodes is equal. As described below, when phase gate G3G3 of pixel 120-4 (i.e., the gate that controls the potential in charge trapping region CG23) is turned off, the potential under charge trapping region CG23 will cause all electrons to transfer into floating diffusion FD.

FIG. 8C shows group 100(t14-t15) including an operating state during a charge shifting operation performed during the first CDS readout phase according to the exemplary embodiment. At time t14 control signal SHS (FIG. 5I) is activated to prepare the appropriate sense amplifier/registers (not shown) for reading out first SHS value. At time t15 phase signal P1 is asserted (FIG. 5C), which activates phase gates G1 to prepare CCG devices CCG2-CCG4 for the transfer of captured charges C1-C3 shift from "end" charge trapping regions CT13-CG13 of CCG devices CCG1-CCG3, respectively, into "first" charge trapping regions CT21-CG21 of CCG devices CCG2-CCG4, respectively. This first part of the charge shifting operation is depicted by the dash-lined arrows in FIG. 8C, and couples charges C1 to C3 to charge trapping regions CT21-CG21 of CCG devices CCG2-CCG4, respectively.

FIG. 8D shows group 100(t16-t18) including an operating state during the final portion of a charge shifting operation and during the SHS readout operation performed during the first CDS readout phase. The charge shifting operation is completed by asserting phase signal P3 at time t16 (FIG. 5E) and asserting phase signal P2 at time t18 (FIG. 5D), which moves captured charges C1-C3 from "first" charge trapping regions CT21-CG21 into middle (or penultimate) charge trapping regions CT22-CG22 of CCG devices CCG2-CCG4, respectively. Note that the de-assertion of phase signal P3 also serves to complete the transfer of captured charge C4 from CCG device CCG4 onto floating diffusion FD, whereby source follower T7 is turned on in proportion to the "value" of captured charge C4 to generate a first SHS value ("SHS1", shown at the bottom of FIG. 8D) that is passed through row select transistor G2 onto the associated output signal line. The first SHS value is sampled between times t14 and t17 after an appropriate settling period, and then control signal SHS is de-asserted at time t17 (FIG. 5I), thus completing the first CDS readout phase.

Figure 9C:
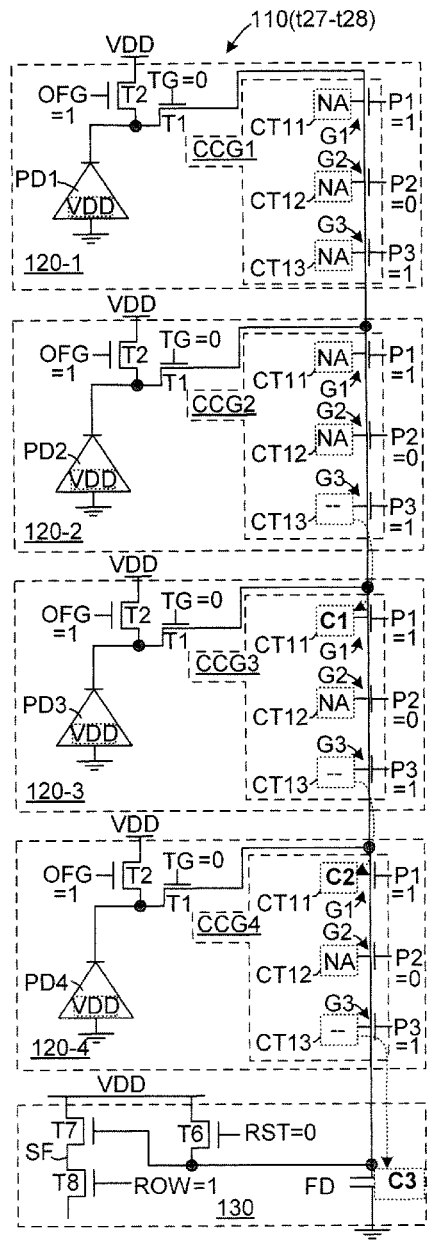
Figure 9D:
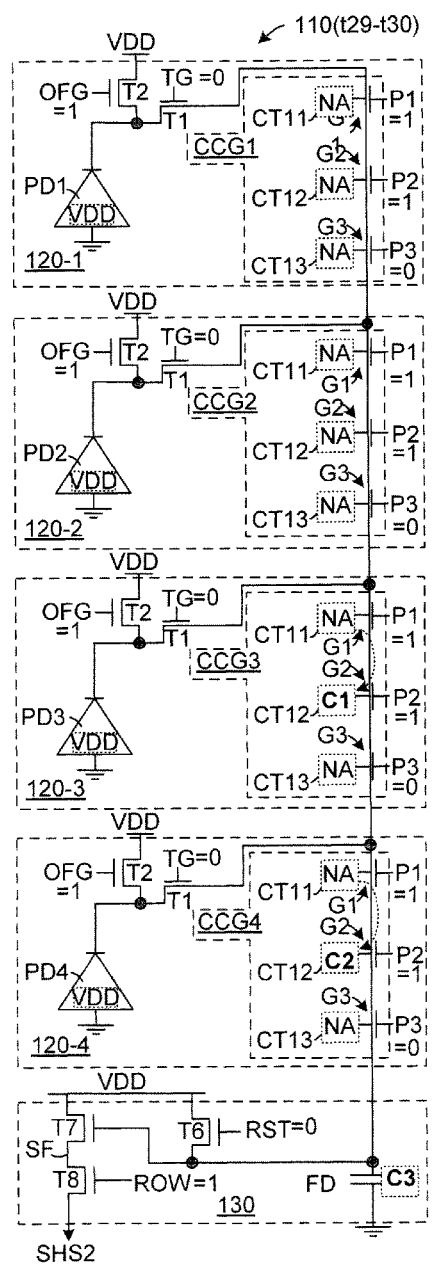

FIGS. 9A-9D depict the second CDS readout phase, which occurs between time t19 and t29 in the timing diagrams of FIGS. 5C-5I, and involves both the CDS readout of "second" captured charge C3 and the "downstream" shift of captured charges C1 and C2 using control signal sequences similar to those described above with reference to the first CDS readout operation. FIG. 9A shows pixel group 110(t19-t20), after control signal SHR is activated at time t19 (FIG. 5H) and reset signal RST is asserted at time t20 (FIG. 5F) to generate a second SHR value SHR2 that is sampled between times t19 and t23. Reset signal RST is subsequently de-asserted at time t22 (FIG. 5F) and control signal SHR is de-asserted at time t20 (FIG. 5H). Note also that phase signal P1 is de-asserted at time t21 (FIG. 5C), thus completing the transfer of charges C1, C2 and C3 into the charge trapping regions CT22, CG12 and CG22, respectively. FIG. 9B shows group 100(t24-t25) when phase signal P3 is asserted (FIG. 5E) and phase gate G3G3 activated to shift captured charges C1-C3 from charge trapping regions CT22-CG22 into end charge trapping regions CT23-CG23 of CCG devices CCG1-CCG4, respectively. Phase signal P2 is de-asserted at time t25 (FIG. 5D) to complete the transfer. FIG. 9C shows group 100(t27-t28), where phase gates G1 are activated at time t27 by the assertion of phase signal P1 (FIG. 5C), coupling charges C1 and C2 to charge trapping regions CG11 and CG21 of CCG devices CCG3 and CCG4, respectively, and coupling charge C3 to floating diffusion FD. Control signal SHS, which was activated at time t26 (FIG. 5I), now samples coupling charge C3 between times t26 and t29, when it is de-activated, thus completing the second CDS readout phase. As shown by group 110(t29-t30) in FIG. 9D, the second charge shifting operation is completed by de-asserting phase signal P3 at time t28 (FIG. 5E) and asserting phase signal P2 at time t30 (FIG. 5D), which moves captured charges C1 and C2 from charge trapping regions CG11-CG21 into charge trapping regions CG22-CG22 of CCG devices CCG3 and CCG4, respectively.

FIGS. 10A-10D depict the third CDS readout phase involving both the CDS readout of "third" captured charge C2 and the shift of captured charge C1 into CCG device CCG4. FIG.

10A shows pixel group 110(t31-t35), while control signal SHR (FIG. 5H) and reset signal RST (FIG. 5F) are asserted to generate a third SHR value SHR3. FIG. 10B shows group 100(t36-t37) when phase signal P3 is asserted (FIG. 5E) and phase gate G3G3 is activated to shift captured charges C1 and C2 from charge trapping regions CG12-CG22 into charge trapping regions CG13-CG23 of CCG devices CCG3 and CCG4, respectively. Phase signal P2 is de-asserted at time t37 (FIG. 5D) to complete the transfer. FIG. 10C shows group 100(t38-t39), where phase gates G1 are activated by the assertion of phase signal P1 (FIG. 5C), coupling charge C1 to charge trapping region CG21 of CCG device CCG4, and coupling charge C2 to floating diffusion FD. As shown by group 110(t40-t41) in FIG. 10D, the third charge shifting operation is completed by asserting phase signal P2 (FIG. 5D) and de-asserting phase signal P3 (FIG. 5E), which moves captured charge C1 into charge trapping region CG22 of CCG device CCG4, and completes the transfer of captured charge C2 from CCG device CCG4 onto floating diffusion FD. Source follower T7 is turned on in proportion to captured charge C2 to generate a third SHS value SHS3 (shown at the bottom of FIG. 10D), which is sampled while control signal SHS is activated during times t38 to t41, and control signal SHS is then de-activated at time t41, thus completing the third CDS readout phase.

Figure 11A:
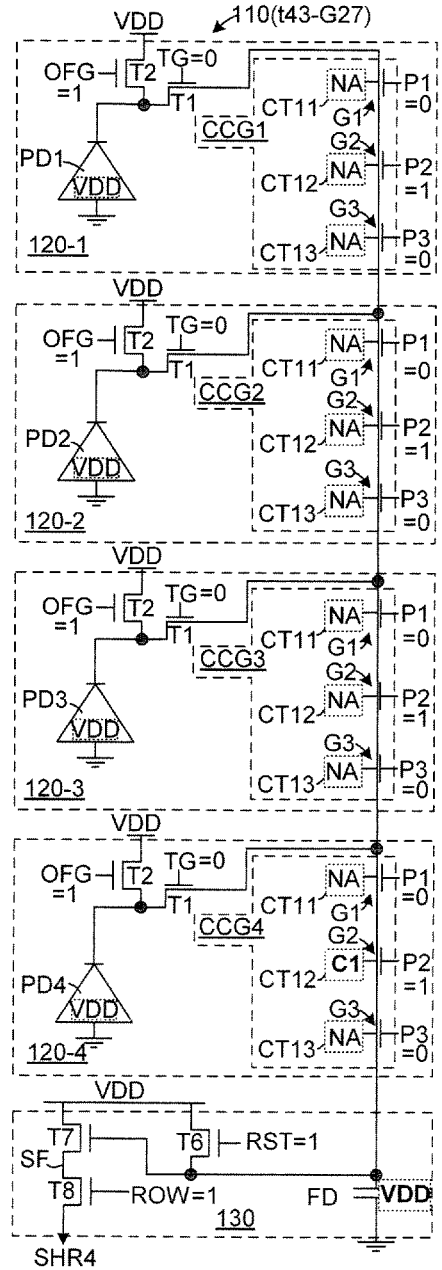
Figure 11B:
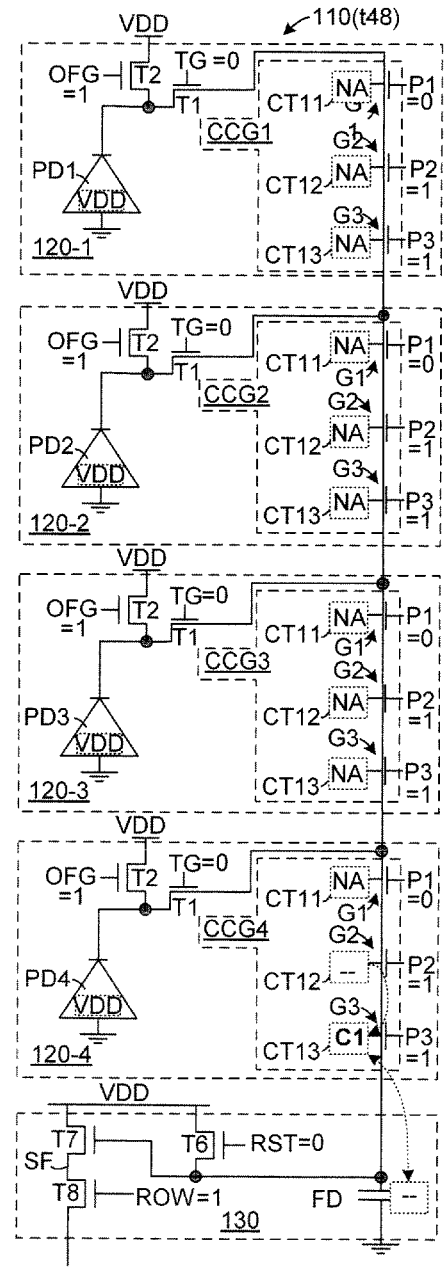

FIGS. 11A-11D depict the fourth CDS readout phase involving the CDS readout of "fourth" captured charge C1. FIG. 11A shows pixel group 110(t43-t47), while control signal SHR (FIG. 5H) and reset signal RST (FIG. 5F) are asserted to generate a fourth SHR value SHR4. FIG. 11B shows group 100(t48) when phase signal P3 is asserted (FIG. 5E) and phase gate G3G3 is activated to shift captured charge C1 from charge trapping regions CG22 into charge trapping region CG23 of CCG device CCG4. FIG. 11C shows group 100(t49-t50), when phase signal P2 is de-asserted (FIG. 5D) to complete this transfer of charge C1 onto charge trapping region CG23 and floating diffusion FD. As shown by group 110(t51-t52) in FIG. 11D, phase signal P3 (FIG. 5E) is de-asserted at time t51 to completely transfer captured charge C1 onto floating diffusion FD, whereby source follower T7 is turned on in proportion to captured charge C1 to generate a fourth SHS value SHS4. Control signal SHS is then de-activated at time t52 (FIG. 5I), thus completing the fourth CDS readout phase.

Referring to FIG. 5G, the first portion of the readout operation ends at time t52 by de-asserting the row select signal transmitted to the first row of pixel groups (e.g., row select signal ROW1 applied to the uppermost row including pixel groups 1101,1 to 1101,N in FIG. 3). The readout operation then proceeds with the assertion of the row select signal transmitted to the second row of pixel groups (e.g., row select signal ROW2 applied to the second row including pixel groups 1102,1 to 1102,N in FIG. 3), and then performing the four CDS readout operations described above with reference to FIGS. 8A-11D. This process is then repeated for each successive row of pixel groups until the last row is accessed (i.e., row select signal ROWM is asserted to access the last row including pixel groups 110M,1 to 110M,N in FIG. 3, and then the four CDS readout operations are performed), thereby completing the capture of image information generated during the integration phase.

As described above, the readout operation is performed in a rolling shutter (line by line) manner similar to substantially all image sensors, but in this case the four captures charges C1 to C4 are read from each pixel group by shifting the captured charges downward from pixels 120-1 to 120-4 to shared readout circuit 130. As a result the charge captured in each pixel spends a different amount of time in each pixel group before being read out (i.e., charge C4 remains in pixel group 110 the least amount of time due to its readout during the first CDS readout phase, and charge C1 remains in pixel group 110 the longest amount of time as it is shifted downward to readout circuit 130).

Figure 12:
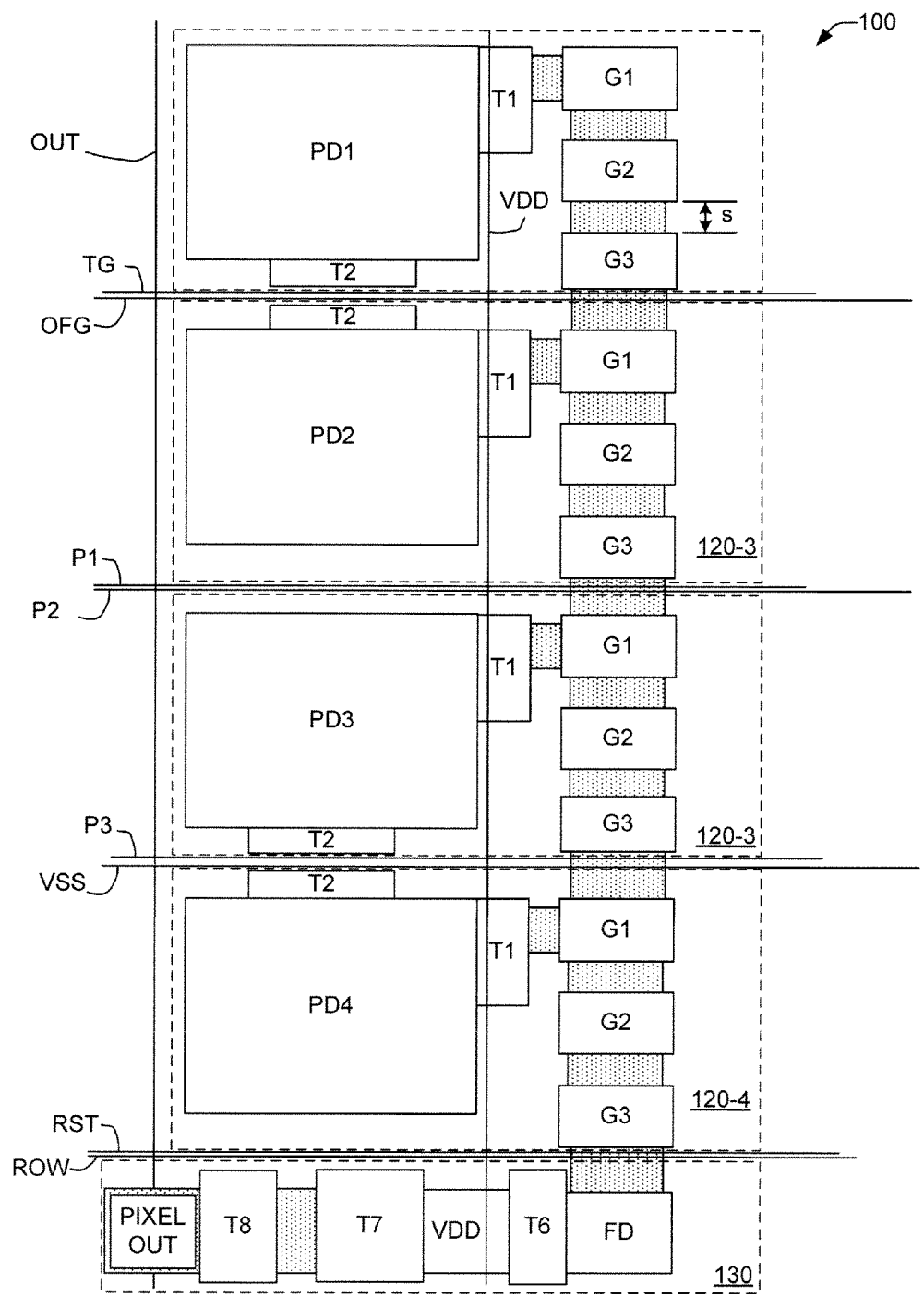
FIG. 12 is a simplified block-level diagram showing an exemplary layout pattern utilized to fabricate the pixel group of FIG. 1 according to a specific embodiment of the present invention.

FIG. 12 is a simplified diagram depicting a preferred layout arrangement utilized to produce pixel group 100 according to another embodiment of the present invention. The depicted layout is optimized for a CMOS process flow, where a first polysilicon (1 POLY) process to form the phase gates P1, P2, P3, OFG transistors, and transfer gates (TGs) of pixels 120-1 to 120-4, and the reset (RST), source-follower (SF) and row select (ROW) transistors of readout circuit 130. A spacing s between the phase gates P1, P2 and P3 is preferably smaller than 0.25 microns to insure large Charge Transfer Efficiency (CTE), and the assignee of this invention achieves a CTE of greater than 0.98 using poly spacing of 0.25 microns or less. In a typical 0.18 µm CMOS process flows, the minimal space between polysilicon structures allowed is typically 0.25 µm, which produces an acceptable device, but in order to realize a better device, the assignee utilizes a proprietary module that achieves a poly-to-poly spacing of 0.2 µm.

A light shield is constructed from the metallization layer that forms global signal lines used to operate the pixel array, and is formed and positioned to block the photons from reaching the ploy gate chain. Internal connections (e.g., for routing the shared control and phase signals to each pixel) are implemented in the interconnect metallization, and are positioned to maximize the optical opening.

Another consideration is whether to use the optional VSS line (mentioned above). The ground connection in a typical image sensor design is supplied through the P+ high conductivity layer, which exists in the substrate. For example, most sensors produced by the assignee of the present application are manufactured on a thin p– epi silicon layer which is grown on a thick p+ wafer. This p+ layer supply the ground from guard rings outside of the array to each of the pixels. A first example of when the VSS external connection for each pixel may be needed is the case of a backside Illumination process, where the back side sensor does not allow for a thick P+ layer, which causes severe degradation of optical performance. In this case the solution is to bring VSS from outside the pixel array using additional line and contact. A first example of when the VSS external connection for each pixel may be needed is when, as in high end sensors, a very deep n implant is formed below the diode array. In this case the substrate is electrically isolated from the pixel P-WELL and again VSS line and contact may be needed.

Although the present invention has been described with respect to certain specific embodiments, it will be clear to those skilled in the art that the inventive features of the present invention are applicable to other embodiments as well, all of which are intended to fall within the scope of the present invention.

The invention claimed is:

1. A method for operating a global shutter image sensor, the image sensor including an array of pixels and a readout circuit, wherein each of the pixels includes a photodiode and a charge coupled gate (CCG) device, wherein the readout circuit includes a floating diffusion, and wherein the method comprises:

controlling the plurality of pixels such that said photodiode of each of the plurality of pixels simultaneously captures a corresponding charge in accordance with first global control signals simultaneously transmitted to every pixel in said image sensor;

controlling the plurality of pixels such that said corresponding captured charges are simultaneously transferred from the photodiode to the CCG device in each of said plurality of pixels in accordance with second global control signals simultaneously transmitted to every pixel in said image sensor; and performing a rolling shutter readout operation following the transfer phase, wherein the CCG devices of the plurality of pixels are connected in series to the readout circuit, and wherein the rolling shutter readout operation includes:

performing a first correlated double-sampling (CDS) readout operation including transferring a first captured charge generated in a first pixel of the plurality of pixels from a first CCG device to the floating diffusion of the readout circuit while simultaneously transferring a second captured charge generated in a second pixel of the plurality of pixels from a second CCG device to the first CCG device, and generating a first CDS readout value on an output signal line connected to the readout circuit in accordance with the first captured charge; and performing a second CDS readout operation including transferring said second captured charge generated in said second pixel of the plurality of pixels from the first CCG device to the floating diffusion of the readout circuit, and generating a second CDS readout value on the output signal line in accordance with the second captured charge.

2. The method of claim 1, wherein controlling the plurality of pixels to capture said corresponding charges comprises coupling said photodiode of each of the plurality of pixels to a voltage source during a pre-integration period, and then de-coupling said photodiode of each of the plurality of pixels from the voltage source and electrically isolating said photodiode of each of the plurality of pixels during an integration period.

3. The method of claim 1, wherein the CCG device in each of said plurality of pixels comprises a multi-phase CCG device including a plurality of phase gates, each phase gate having an associated charge trapping region, and wherein controlling the plurality of pixels to simultaneously transfer the captured charges from the photodiode to the CCG device in each of said plurality of pixels comprises:

activating a transfer gate connected between the photodiode and the CCG device in each of said plurality of pixels and activating a first phase gate of said CCG device in each of said plurality of pixels;

activating a second phase gate of said CCG device in each of said plurality of pixels and de-activating said transfer gate in each of said plurality of pixels; and de-activating said first phase gate in each of said plurality of pixels, whereby each said captured charge is stored in a charge trapping region associated with said second phase gate.

4. The method of claim 3, further comprising, after de-activating said first phase gate, reducing by at least one-half a voltage level applied to a gate terminal of said second phase gate of said CCG device in some of said plurality of pixels.

5. The method of claim 1, wherein performing the rolling shutter readout operation comprises:

resetting the floating diffusion of the first readout circuit and generating a first sample-and-hold reset (SHR) readout value on said first associated output signal line during a first time period;

transferring the first captured charge to the floating diffusion of the first readout circuit and generating a first sample-and-hold image (SHS) readout value on said first associated output signal line during a second time period;

resetting the floating diffusion of the first readout circuit and generating a second SHR readout value on said first associated output signal line during a third time period; and transferring the second captured charge to the floating diffusion of the first readout circuit and generating a second SHS readout value on said first associated output signal line during a fourth time period.

6. The method of claim 5, wherein transferring the first captured charge to the floating diffusion of the first readout circuit comprises transferring the first captured charge from the first CCG device to the floating diffusion of the first readout circuit, and transferring the second captured charge from a second CCG device to the first CCG device, and wherein transferring the second captured charge to the floating diffusion of the first readout circuit comprises transferring the second captured charge from the first CCG device to the floating diffusion.

7. The method of claim 6, further comprising:

transferring a third captured charge from a third CCG device to the second CCG device and transferring a fourth captured charge from a fourth CCG device to the third CCG device during the first time period, and transferring the third captured charge from the second CCG device to the first CCG device and transferring the fourth captured charge from the third CCG device to the second CCG device during the second time period.

8. The method of claim 7, further comprising:

resetting the floating diffusion of the first readout circuit and generating a third SHR readout value on said first associated output signal line during a fifth time period;

transferring the third captured charge from the first CCG device to the floating diffusion of the first readout circuit and generating a third SHS readout value on said first associated output signal line during a sixth time period;

resetting the floating diffusion of the first readout circuit and generating a fourth SHR readout value on said first associated output signal line during a seventh time period; and transferring said fourth captured charge from the first CCG device to the floating diffusion of the first readout circuit and generating a fourth SHS readout value on said first associated output signal line during an eighth time period.

9. The method of claim 5, wherein the CCG device in each of said plurality of pixels comprises a multi-phase CCG device including a plurality of charge trapping region, and wherein transferring the first captured charge to the floating diffusion of the first readout circuit comprises transferring the first captured charge from a penultimate said charge trapping region of the first CCG device to an end charge trapping region of the first CCG device, and then transferring the first captured charge from the end charge trapping region to said floating diffusion.

10. A method for operating a global shutter image sensor, the image sensor including a group of pixels sequentially arranged in a column including a penultimate pixel and end pixel, the image sensor also including a readout circuit disposed such that the end pixel is between the readout circuit and the penultimate pixel, wherein each of the pixels includes a photodiode and a charge coupled gate (CCG) device, wherein the CCG devices of the group of pixels are connected in series to the readout circuit such that a first said CCG device of the end pixel is connected between the readout circuit and a second CCG device of the penultimate pixel, wherein the readout circuit includes a floating diffusion, and wherein the method comprises:

controlling the plurality of pixels such that said photodiode of each of the plurality of pixels simultaneously captures a corresponding charge;

controlling the plurality of pixels such that said corresponding captured charges are simultaneously transferred from the photodiode to the CCG device in each of said plurality of pixels; and during a subsequent rolling shutter readout phase:

performing a first correlated double-sampling (CDS) readout operation including transferring a first said captured charge from said first CCG device of said end pixel to said floating diffusion of said readout circuit while simultaneously shifting a second said captured charge from said second CCG device of the penultimate pixel into the first CCG device of said end pixel, and generating a first sample-and-hold image (SHS) readout value on said output signal line;

performing a second CDS readout operation including transferring said second captured charge from the first CCG device of said end pixel to the floating diffusion of the readout circuit and generating a second SHS readout value on said output signal line.

11. The method of claim 10, wherein controlling the plurality of pixels to capture said corresponding charges comprises coupling said photodiode of each of the plurality of pixels to a voltage source during a pre-integration period, and then de-coupling said photodiode of each of the plurality of pixels from the voltage source and electrically isolating said photodiode of each of the plurality of pixels during an integration period.

12. The method of claim 11,
wherein the CCG device in each of said plurality of pixels comprises a multi-phase CCG device including a plurality of phase gates, each phase gate having an associated charge trapping region, and
wherein controlling the plurality of pixels to simultaneously transfer the captured charges from the photodiode to the CCG device in each of said plurality of pixels comprises:
activating a transfer gate connected between the photodiode and the CCG device in each of said plurality of pixels and activating a first phase gate of said CCG device in each of said plurality of pixels;
activating a second phase gate of said CCG device in each of said plurality of pixels and de-activating said transfer gate in each of said plurality of pixels; and
de-activating said first phase gate in each of said plurality of pixels, whereby each said captured charge is stored in a charge trapping region associated with said second phase gate.

13. The method of claim 10, further comprising:
before transferring said first captured charge, resetting the floating diffusion of the readout circuit and generating a first sample-and-hold reset (SHR) readout value on an output signal line during a first time period;
after transferring said first captured charge from the first CCG device of said end pixel to the floating diffusion, generating said first SHS readout value on said output signal line during a second time period;

resetting the floating diffusion of the readout circuit and generating a second SHR readout value on said output signal line during a third time period; and
transferring said second captured charge from the first CCG device of said end pixel to the floating diffusion of the readout circuit and generating said second SHS readout value on said output signal line during a fourth time period.

14. The method of claim 13, further comprising:
transferring a third captured charge from a third CCG device in a third pixel to the second CCG device and transferring a fourth captured charge from a fourth CCG device in a fourth pixel to the third CCG device during the first time period, and
transferring the third captured charge from the second CCG device to the first CCG device and transferring the fourth captured charge from the third CCG device to the second CCG device during the second time period.

15. The method of claim 14, further comprising:
resetting the floating diffusion of the readout circuit and generating a third SHR readout value on said output signal line during a fifth time period;
transferring the third captured charge from the first CCG device to the floating diffusion of the readout circuit and generating a third SHS readout value on said output signal line during a sixth time period;
resetting the floating diffusion of the readout circuit and generating a fourth SHR readout value on said output signal line during a seventh time period; and
transferring said fourth captured charge from the first CCG device to the floating diffusion of the readout circuit and generating a fourth SHS readout value on said output signal line during an eighth time period.

16. The method of claim 13,
wherein the CCG device in each of said plurality of pixels comprises a multi-phase CCG device including a plurality of charge trapping region, and
wherein transferring the first captured charge to the floating diffusion of the readout circuit comprises transferring the first captured charge from a penultimate said charge trapping region of the first CCG device to an end charge trapping region of the first CCG device, and then transferring the first captured charge from the end charge trapping region to said floating diffusion.

17. A method for operating a global shutter image sensor, the image sensor including a plurality of pixel groups arranged in rows and columns, each pixel group including a plurality of pixels and a readout circuit, wherein each of the pixels includes a photodiode and a charge coupled gate (CCG) device, wherein the readout circuit includes a floating diffusion and is connected to an associated output signal line, wherein the method comprises:
during an integration phase, controlling the plurality of pixels in each said pixel group such that said photodiode of each of the plurality of pixels simultaneously captures a corresponding charge in accordance with first global control signals simultaneously transmitted to every pixel in said image sensor;
during a transfer phase following the integration phase, controlling the plurality of pixels in each said pixel group such that said corresponding captured charges are simultaneously transferred from the photodiode to the CCG device in each of said plurality of pixels in accordance with second global control signals simultaneously transmitted to every pixel in said image sensor; and
performing a rolling shutter readout operation following the transfer phase, wherein the CCG devices of the plurality of pixels in each said pixel group are connected in a chained CCG device arrangement to the readout circuit, and the rolling shutter readout operation including:

performing a first plurality of correlated double-sampling (CDS) readout operations including sequentially transferring a first plurality of captured charges from a first plurality of CCG devices disposed in a first chained CCG device arrangement and associated with a first plurality of pixels of a first pixel group to one of a first adjacent CCG device of said first chained CCG device arrangement and the first floating diffusion of a first readout circuit in said first pixel group, and generating a first plurality of CDS readout values on a first said associated output signal line; and performing a second plurality of CDS readout operations including sequentially transferring a second plurality of captured charges from a second plurality of CCG devices disposed in a second chained CCG device arrangement and associated with a second plurality of pixels of a second pixel group to one of a second adjacent CCG device of said second chained CCG device arrangement and the second floating diffusion of a second readout circuit in said second pixel group, and generating a second plurality of CDS readout values on said first associated output signal line.

* * * * *